(12) United States Patent
Liu et al.

(10) Patent No.: US 9,769,232 B2
(45) Date of Patent: *Sep. 19, 2017

(54) APPARATUS AND METHOD FOR MANAGING MEDIA CONTENT

(71) Applicant: AT&T Intellectual Property I, LP, Atlanta, GA (US)

(72) Inventors: Zhu Liu, Marlboro, NJ (US); Andrea Basso, Torino (IT); David Crawford Gibbon, Lincroft, NJ (US); Harris Drucker, Long Branch, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/697,221

(22) Filed: Apr. 27, 2015

(65) Prior Publication Data
US 2015/0229691 A1 Aug. 13, 2015

Related U.S. Application Data

(63) Continuation of application No. 12/270,245, filed on Nov. 13, 2008, now Pat. No. 9,049,477.

(51) Int. Cl.
*G06F 15/16* (2006.01)
*H04L 29/06* (2006.01)
(Continued)

(52) U.S. Cl.
CPC .......... *H04L 65/60* (2013.01); *H04L 43/0876* (2013.01); *H04L 65/1016* (2013.01); *H04L 65/4084* (2013.01); *H04L 65/4092* (2013.01); *H04N 5/44543* (2013.01); *H04N 21/235* (2013.01); *H04N 21/435* (2013.01); *H04N 21/440236* (2013.01); *H04N 21/4532* (2013.01);
(Continued)

(58) Field of Classification Search
CPC .............................. H04L 65/60; H04L 65/601
See application file for complete search history.

(56) References Cited

U.S. PATENT DOCUMENTS 6,714,909 B1 * 3/2004 Gibbon ............. G06F 17/30787
704/246
8,230,461 B1 * 7/2012 Ledermann ....... G06F 17/30017
725/133
(Continued)

*Primary Examiner* — Nam Tran
(74) *Attorney, Agent, or Firm* — Gustin & Gust, PLC; Joseph Hrutka

(57) ABSTRACT

A system that incorporates teachings of the present disclosure may include, for example, a server having a controller to monitor for media content from a first source that is distributable where the media content is adjusted for distribution to a plurality of communication devices that are associated with a user and a portion of the plurality of communication devices use different communication protocols from another portion of the plurality of communication devices, obtain content metadata from the media content, receive a request for information associated with the media content from a first communication device of the plurality of communication devices of the user, compile the information from the content metadata based at least in part on a user profile associated with the user, and transmit the information to the first communication device. Other embodiments are disclosed.

18 Claims, 16 Drawing Sheets

1500

(51) Int. Cl.
*H04N 5/445* (2011.01)
*H04N 21/235* (2011.01)
*H04N 21/435* (2011.01)
*H04N 21/4402* (2011.01)
*H04N 21/45* (2011.01)
*H04N 21/61* (2011.01)
*H04N 21/84* (2011.01)
*H04L 12/26* (2006.01)

(52) U.S. Cl.
CPC ......... *H04N 21/6125* (2013.01); *H04N 21/84* (2013.01)

(56) References Cited

U.S. PATENT DOCUMENTS

| | | |
|---|---|---|
| 2002/0053084 A1 | 5/2002 | Escobar et al. |
| 2002/0184195 A1* | 12/2002 | Qian ................. G06F 17/30867 |
| 2007/0033521 A1 | 2/2007 | Sull et al. |
| 2007/0061725 A1 | 3/2007 | Isaac et al. |
| 2007/0250467 A1 | 10/2007 | Mesnik et al. |
| 2008/0049030 A1 | 2/2008 | Keslin |
| 2008/0244644 A1 | 10/2008 | McCausland |

* cited by examiner

200

300

400

500

600

900

1200

1300

2. Your Topics of Interest

| Add a new topic | | Source | Notification | iPod Video | Nano/Shuffle |
|---|---|---|---|---|---|
| Edit | Science | Delete Main | None | | |
| Edit | Telco News | Delete Main | None | | |
| Edit | My Teams | Delete Main | None | | |
| Edit | Politics | Delete Custom | None | | |

1400

1500

APPARATUS AND METHOD FOR MANAGING MEDIA CONTENT

CROSS-REFERENCE TO RELATED APPLICATION(S)

This application is a continuation of U.S. patent application Ser. No. 12/270,245 filed Nov. 13, 2008 by Liu et al., entitled "Apparatus and Method for Managing Media Content." All sections of the aforementioned application are incorporated herein by reference in its entirety.

FIELD OF THE DISCLOSURE

The present disclosure relates generally to communication systems and more specifically to an apparatus and method for managing media content.

BACKGROUND

Networks are continuously expanding their abilities to distribute media content to users in far-reaching locations. Users often have multiple devices for presenting the media content, which can include fixed devices and mobile devices. These devices can often operate using a number of different communication protocols and often utilize different formats of the media content for presentation.

DETAILED DESCRIPTION

Figure 1:
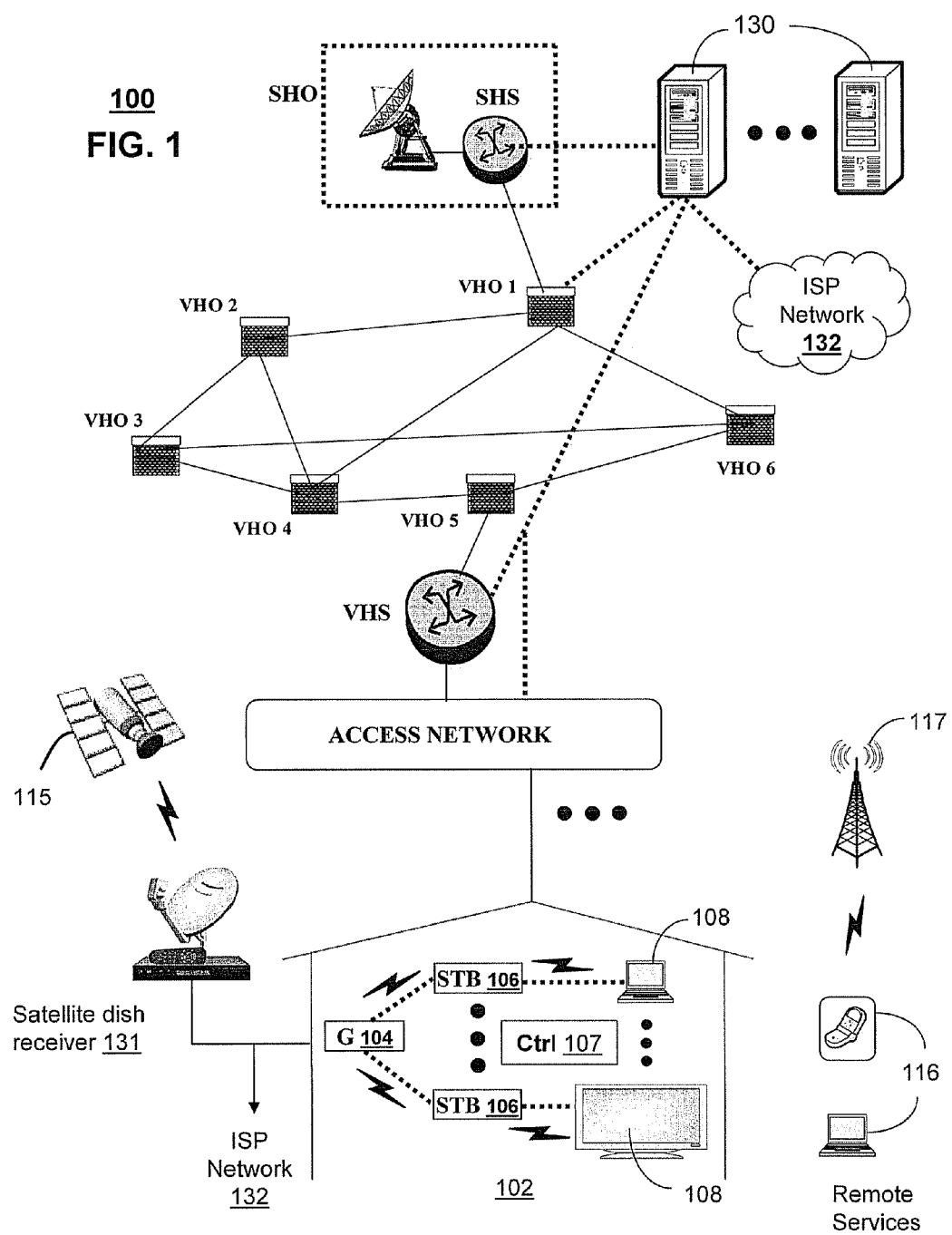
FIGS. 1-4 depict illustrative embodiments of communication systems that provide media services.

One embodiment of the present disclosure can entail a computer-readable storage medium. The storage medium can include computer instructions for monitoring for distributable media content from a first source; adjusting the media content for distribution to a plurality of communication devices that are associated with a user based at least in part on a user profile associated with the user where a portion of the plurality of communication devices use communication protocols different from another portion of the plurality of communication devices, obtain content metadata from the media content, monitoring for Electronic Programming Guide (EPG) metadata from a second source where the EPG metadata is associated with the media content, receiving a request for information associated with the media content from a first communication device of the plurality of communication devices of the user, compiling the information from the EPG metadata and the content metadata based at least in part on the user profile, and transmitting the information to the first communication device.

Another embodiment of the present disclosure can entail a server having a controller to monitor for media content that is distributable where the media content is capable of distribution to a plurality of communication devices that are associated with a user and where a portion of the plurality of communication devices use different communication protocols from another portion of the plurality of communication devices, generate content metadata from the media content using at least one of shot boundary detection, anchorperson detection and story boundary detection, receive a request for information associated with the media content from a first communication device of the plurality of communication devices of the user, compile the information based at least in part on the content metadata, and transmit the information to the first communication device.

Yet another embodiment of the present disclosure can entail a network element having a controller to transmit information associated with media content to a first communication device of a plurality of communication devices of a user in response to a request for the information from the user, where the media content is capable of distribution to the plurality of communication devices, where a portion of the plurality of communication devices uses different communication protocols from another portion of the plurality of communication devices, where the information comprises content metadata that is extracted from the media content and EPG metadata that is associated with the media content, and where the information is based at least in part on a user profile associated with the user.

Yet another embodiment of the present disclosure can entail a server having a controller to monitor for media content from a first source that is distributable where the media content is adjusted for distribution to a plurality of communication devices that are associated with a user and where a portion of the plurality of communication devices uses different communication protocols from another portion of the plurality of communication devices, obtain content metadata from the media content, receive a request for information associated with the media content from a first communication device of the plurality of communication devices of the user, compile the information from the content metadata based at least in part on a user profile associated with the user, and transmit the information to the first communication device.

Yet another embodiment of the present disclosure can entail a method including monitoring for media content where the media content is capable of distribution to a plurality of communication devices that are associated with a user and where a portion of the plurality of communication devices uses different communication protocols from another portion of the plurality of communication devices, obtaining content metadata from the media content, monitoring for EPG metadata associated with the media content, receiving a request for information associated with the media content from a first communication device of the plurality of communication devices of the user, compiling the information from the EPG metadata and the content metadata based at least in part on the user profile, and transmitting the information to the first communication device.

FIG. 1 depicts an illustrative embodiment of a first communication system 100 for delivering media content. The communication system 100 can represent an Internet Protocol Television (IPTV) broadcast media system. In a typical IPTV infrastructure, there is a super head-end office (SHO) with at least one super headend office server (SHS) which receives national media programs from satellite and/or media servers from service providers of multimedia broadcast channels. In the present context, media programs can represent audio content, moving image content such as videos, still image content, and/or combinations thereof. The SHS server forwards IP packets associated with the media content to video head-end servers (VHS) via a network of aggregation points such as video head-end offices (VHO) according to a common multicast communication method.

The VHS then distributes multimedia broadcast programs via an access network to commercial and/or residential buildings 102 housing a gateway 104 (such as a residential gateway or RG). The access network can represent a bank of digital subscriber line access multiplexers (DSLAMs) located in a central office or a service area interface that provide broadband services over optical links or copper twisted pairs to buildings 102. The gateway 104 distributes broadcast signals to media processors 106 such as Set-Top Boxes (STBs) which in turn present broadcast selections to media devices 108 such as computers or television sets managed in some instances by a media controller 107 (such as an infrared or RF remote control).

Unicast traffic can also be exchanged between the media processors 106 and subsystems of the IPTV media system for services such as video-on-demand (VoD). It will be appreciated by one of ordinary skill in the art that the media devices 108 and/or portable communication devices 116 shown in FIG. 1 can be an integral part of the media processor 106 and can be communicatively coupled to the gateway 104. In this particular embodiment, an integral device such as described can receive, respond, process and present multicast or unicast media content.

The IPTV media system can be coupled to one or more computing devices 130 a portion of which can operate as a web server for providing portal services over an Internet Service Provider (ISP) network 132 to fixed line media devices 108 or portable communication devices 116 by way of a wireless access point 117 providing Wireless Fidelity or WiFi services, or cellular communication services (such as GSM, CDMA, UMTS, WiMAX, etc.).

A satellite broadcast television system can be used in place of the IPTV media system. In this embodiment, signals transmitted by a satellite 115 can be intercepted by a satellite dish receiver 131 coupled to building 102 which conveys media signals to the media processors 106. The media receivers 106 can be equipped with a broadband port to the ISP network 132. Although not shown, the communication system 100 can also be combined or replaced with analog or digital broadcast distributions systems such as cable TV systems.

Figure 2:
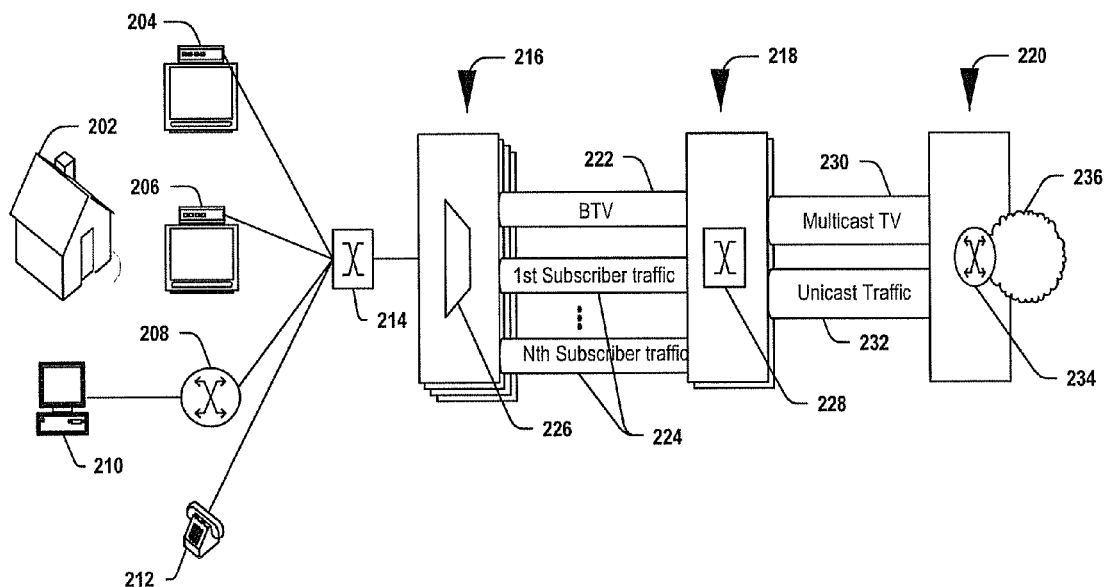

FIG. 2 depicts an illustrative embodiment of a second communication system 200 for delivering media content. Communication system 200 can be overlaid or operably coupled with communication system 100 as another representative embodiment of said communication system. The system 200 includes a distribution switch/router system 228 at a central office 218. The distribution switch/router system 228 receives video data via a multicast television stream 230 from a second distribution switch/router 234 at an intermediate office 220. The multicast television stream 230 includes Internet Protocol (IP) data packets addressed to a multicast IP address associated with a television channel. The distribution switch/router system 228 can cache data associated with each television channel received from the intermediate office 22.

The distribution switch/router system 228 also receives unicast data traffic from the intermediate office 220 via a unicast traffic stream 232. The unicast traffic stream 232 includes data packets related to devices located at a particular residence, such as the residence 202. For example, the unicast traffic stream 232 can include data traffic related to a digital subscriber line, a telephone line, another data connection, or any combination thereof. To illustrate, the unicast traffic stream 232 can communicate data packets to and from a telephone 212 associated with a subscriber at the residence 202. The telephone 212 can be a Voice over Internet Protocol (VoIP) telephone. To further illustrate, the unicast traffic stream 232 can communicate data packets to and from a personal computer 210 at the residence 202 via one or more data routers 208. In an additional illustration, the unicast traffic stream 232 can communicate data packets to and from a set-top box device, such as the set-top box devices 204, 206. The unicast traffic stream 232 can communicate data packets to and from the devices located at the residence 202 via one or more residential gateways 214 associated with the residence 202.

The distribution switch/router system 228 can send data to one or more access switch/router systems 226. The access switch/router system 226 can include or be included within a service area interface 216. In a particular embodiment, the access switch/router system 226 can include a DSLAM. The access switch/router system 226 can receive data from the distribution switch/router system 228 via a broadcast television (BTV) stream 222 and a plurality of unicast subscriber traffic streams 224. The BTV stream 222 can be used to communicate video data packets associated with a multicast stream.

For example, the BTV stream 222 can include a multicast virtual local area network (VLAN) connection between the distribution switch/router system 228 and the access switch/router system 226. Each of the plurality of subscriber traffic streams 224 can be used to communicate subscriber specific data packets. For example, the first subscriber traffic stream can communicate data related to a first subscriber, and the nth subscriber traffic stream can communicate data related to an nth subscriber. Each subscriber to the system 200 can be associated with a respective subscriber traffic stream 224. The subscriber traffic stream 224 can include a subscriber VLAN connection between the distribution switch/router system 228 and the access switch/router system 226 that is associated with a particular set-top box device 204, 206, a particular residence 202, a particular residential gateway 214, another device associated with a subscriber, or any combination thereof.

In an illustrative embodiment, a set-top box device, such as the set-top box device 204, receives a channel change command from an input device, such as a remoter control device. The channel change command can indicate selection of an IPTV channel. After receiving the channel change command, the set-top box device 204 generates channel selection data that indicates the selection of the IPTV channel. The set-top box device 204 can send the channel selection data to the access switch/router system 226 via the residential gateway 214. The channel selection data can include an Internet Group Management Protocol (IGMP) Join request. In an illustrative embodiment, the access switch/router system 226 can identify whether it is joined to a multicast group associated with the requested channel based on information in the IGMP Join request.

If the access switch/router system 226 is not joined to the multicast group associated with the requested channel, the access switch/router system 226 can generate a multicast stream request. The multicast stream request can be generated by modifying the received channel selection data. In an illustrative embodiment, the access switch/router system 226 can modify an IGMP Join request to produce a proxy IGMP Join request. The access switch/router system 226 can send the multicast stream request to the distribution switch/router system 228 via the BTV stream 222. In response to receiving the multicast stream request, the distribution switch/router system 228 can send a stream associated with the requested channel to the access switch/router system 226 via the BTV stream 222.

Figure 3:
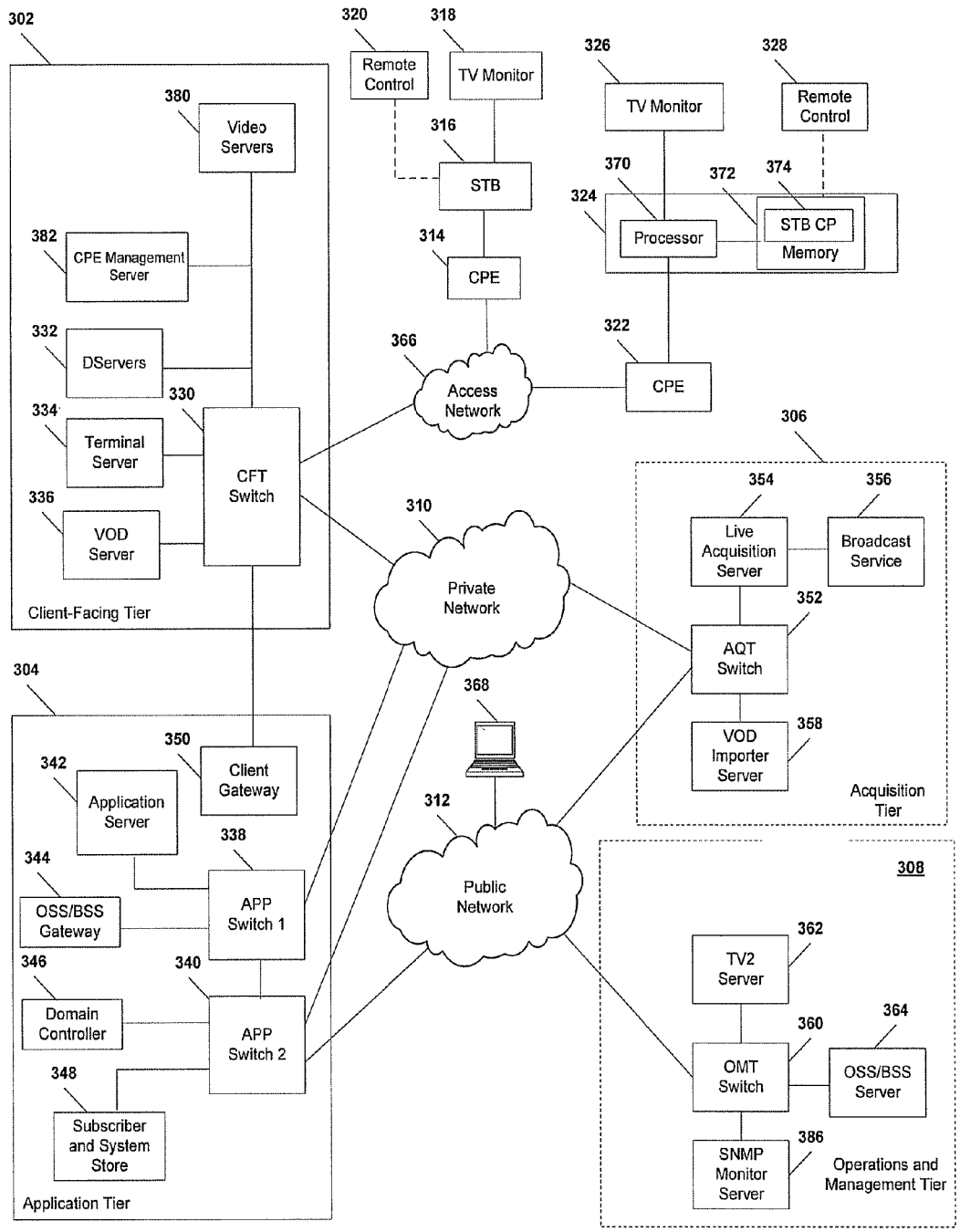

FIG. 3 depicts an illustrative embodiment of a third communication system 300 for delivering media content. Communication system 300 can be overlaid or operably coupled with communication systems 100-200 as another representative embodiment of said communication systems. As shown, the system 300 can include a client facing tier 302, an application tier 304, an acquisition tier 306, and an operations and management tier 308. Each tier 302, 304, 306, 308 is coupled to a private network 310, such as a network of common packet-switched routers and/or switches; to a public network 312, such as the Internet; or to both the private network 310 and the public network 312. For example, the client-facing tier 302 can be coupled to the private network 310. Further, the application tier 304 can be coupled to the private network 310 and to the public network 312. The acquisition tier 306 can also be coupled to the private network 310 and to the public network 312. Additionally, the operations and management tier 308 can be coupled to the public network 312.

As illustrated in FIG. 3, the various tiers 302, 304, 306, 308 communicate with each other via the private network 310 and the public network 312. For instance, the client-facing tier 302 can communicate with the application tier 304 and the acquisition tier 306 via the private network 310. The application tier 304 can communicate with the acquisition tier 306 via the private network 310. Further, the application tier 304 can communicate with the acquisition tier 306 and the operations and management tier 308 via the public network 312. Moreover, the acquisition tier 306 can communicate with the operations and management tier 308 via the public network 312. In a particular embodiment, elements of the application tier 304, including, but not limited to, a client gateway 350, can communicate directly with the client-facing tier 302.

The client-facing tier 302 can communicate with user equipment via an access network 366, such as an IPTV access network. In an illustrative embodiment, customer premises equipment (CPE) 314, 322 can be coupled to a local switch, router, or other device of the access network 366. The client-facing tier 302 can communicate with a first representative set-top box device 316 via the first CPE 314 and with a second representative set-top box device 324 via the second CPE 322. In a particular embodiment, the first representative set-top box device 316 and the first CPE 314 can be located at a first customer premise, and the second representative set-top box device 324 and the second CPE 322 can be located at a second customer premise.

In another particular embodiment, the first representative set-top box device 316 and the second representative set-top box device 324 can be located at a single customer premise, both coupled to one of the CPE 314, 322. The CPE 314, 322 can include routers, local area network devices, modems, such as digital subscriber line (DSL) modems, any other suitable devices for facilitating communication between a set-top box device and the access network 366, or any combination thereof.

In an illustrative embodiment, the client-facing tier 302 can be coupled to the CPE 314, 322 via fiber optic cables. In another illustrative embodiment, the CPE 314, 322 can include DSL modems that are coupled to one or more network nodes via twisted pairs, and the client-facing tier 302 can be coupled to the network nodes via fiber-optic cables. Each set-top box device 316, 324 can process data received via the access network 366, via a common IPTV software platform.

The first set-top box device 316 can be coupled to a first external display device, such as a first television monitor 318, and the second set-top box device 324 can be coupled to a second external display device, such as a second television monitor 326. Moreover, the first set-top box device 316 can communicate with a first remote control 320, and the second set-top box device 324 can communicate with a second remote control 328. The set-top box devices 316, 324 can include IPTV set-top box devices; video gaming devices or consoles that are adapted to receive IPTV content; personal computers or other computing devices that are adapted to emulate set-top box device functionalities; any other device adapted to receive IPTV content and transmit data to an IPTV system via an access network; or any combination thereof.

In an illustrative, non-limiting embodiment, each set-top box device 316, 324 can receive data, video, or any combination thereof, from the client-facing tier 302 via the access network 366 and render or display the data, video, or any combination thereof, at the display device 318, 326 to which it is coupled. In an illustrative embodiment, the set-top box devices 316, 324 can include tuners that receive and decode television programming signals or packet streams for transmission to the display devices 318, 326. Further, the set-top box devices 316, 324 can each include a STB processor 370 and a STB memory device 372 that is accessible to the STB processor 370. In one embodiment, a computer program, such as the STB computer program 374, can be embedded within the STB memory device 372.

In an illustrative embodiment, the client-facing tier 302 can include a client-facing tier (CFT) switch 330 that manages communication between the client-facing tier 302 and the access network 366 and between the client-facing tier 302 and the private network 310. As illustrated, the CFT switch 330 is coupled to one or more distribution servers, such as Distribution-servers (D-servers) 332, that store, format, encode, replicate, or otherwise manipulate or prepare video content for communication from the client-facing tier 302 to the set-top box devices 316, 324. The CFT switch 330 can also be coupled to a terminal server 334 that provides terminal devices with a point of connection to the IPTV system 300 via the client-facing tier 302.

In a particular embodiment, the CFT switch 330 can be coupled to a VoD server 336 that stores or provides VoD content imported by the IPTV system 300. Further, the CFT switch 330 is coupled to one or more video servers 380 that receive video content and transmit the content to the set-top boxes 316, 324 via the access network 366. The client-facing tier 302 may include a CPE management server 382 that manages communications to and from the CPE 314 and the CPE 322. For example, the CPE management server 382 may collect performance data associated with the set-top box devices 316, 324 from the CPE 314 or the CPE 322 and forward the collected performance data to a server associated with the operations and management tier 308.

In an illustrative embodiment, the client-facing tier 302 can communicate with a large number of set-top boxes, such as the representative set-top boxes 316, 324, over a wide geographic area, such as a metropolitan area, a viewing area, a statewide area, a regional area, a nationwide area or any other suitable geographic area, market area, or subscriber or customer group that can be supported by networking the client-facing tier 302 to numerous set-top box devices. In a particular embodiment, the CFT switch 330, or any portion thereof, can include a multicast router or switch that communicates with multiple set-top box devices via a multicast-enabled network.

As illustrated in FIG. 3, the application tier 304 can communicate with both the private network 310 and the public network 312. The application tier 304 can include a first application tier (APP) switch 338 and a second APP switch 340. In a particular embodiment, the first APP switch 338 can be coupled to the second APP switch 340. The first APP switch 338 can be coupled to an application server 342 and to an OSS/BSS gateway 344. In a particular embodiment, the application server 342 can provide applications to the set-top box devices 316, 324 via the access network 366, which enable the set-top box devices 316, 324 to provide functions, such as interactive program guides, video gaming, display, messaging, processing of VoD material and other IPTV content, etc. In an illustrative embodiment, the application server 342 can provide location information to the set-top box devices 316, 324. In a particular embodiment, the OSS/BSS gateway 344 includes operation systems and support (OSS) data, as well as billing systems and support (BSS) data. In one embodiment, the OSS/BSS gateway 344 can provide or restrict access to an OSS/BSS server 364 that stores operations and billing systems data.

The second APP switch 340 can be coupled to a domain controller 346 that provides Internet access, for example, to users at their computers 368 via the public network 312. For example, the domain controller 346 can provide remote Internet access to IPTV account information, e-mail, personalized Internet services, or other online services via the public network 312. In addition, the second APP switch 340 can be coupled to a subscriber and system store 348 that includes account information, such as account information that is associated with users who access the IPTV system 300 via the private network 310 or the public network 312. In an illustrative embodiment, the subscriber and system store 348 can store subscriber or customer data and create subscriber or customer profiles that are associated with IP addresses, stock-keeping unit (SKU) numbers, other identifiers, or any combination thereof, of corresponding set-top box devices 316, 324. In another illustrative embodiment, the subscriber and system store can store data associated with capabilities of set-top box devices associated with particular customers.

In a particular embodiment, the application tier 304 can include a client gateway 350 that communicates data directly to the client-facing tier 302. In this embodiment, the client gateway 350 can be coupled directly to the CFT switch 330. The client gateway 350 can provide user access to the private network 310 and the tiers coupled thereto. In an illustrative embodiment, the set-top box devices 316, 324 can access the IPTV system 300 via the access network 366, using information received from the client gateway 350. User devices can access the client gateway 350 via the access network 366, and the client gateway 350 can allow such devices to access the private network 310 once the devices are authenticated or verified. Similarly, the client gateway 350 can prevent unauthorized devices, such as hacker computers or stolen set-top box devices from accessing the private network 310, by denying access to these devices beyond the access network 366.

For example, when the first representative set-top box device 316 accesses the client-facing tier 302 via the access network 366, the client gateway 350 can verify subscriber information by communicating with the subscriber and system store 348 via the private network 310. Further, the client gateway 350 can verify billing information and status by communicating with the OSS/BSS gateway 344 via the private network 310. In one embodiment, the OSS/BSS gateway 344 can transmit a query via the public network 312 to the OSS/BSS server 364. After the client gateway 350 confirms subscriber and/or billing information, the client gateway 350 can allow the set-top box device 316 to access IPTV content and VoD content at the client-facing tier 302. If the client gateway 350 cannot verify subscriber information for the set-top box device 316, because it is connected to an unauthorized twisted pair, the client gateway 350 can block transmissions to and from the set-top box device 316 beyond the access network 366.

As indicated in FIG. 3, the acquisition tier 306 includes an acquisition tier (AQT) switch 352 that communicates with the private network 310. The AQT switch 352 can also communicate with the operations and management tier 308 via the public network 312. In a particular embodiment, the AQT switch 352 can be coupled to one or more live Acquisition-servers (A-servers) 354 that receive or acquire television content, movie content, advertisement content, other video content, or any combination thereof, from a broadcast service 356, such as a satellite acquisition system or satellite head-end office. In a particular embodiment, the live acquisition server 354 can transmit content to the AQT switch 352, and the AQT switch 352 can transmit the content to the CFT switch 330 via the private network 310.

In an illustrative embodiment, content can be transmitted to the D-servers 332, where it can be encoded, formatted, stored, replicated, or otherwise manipulated and prepared for communication from the video server(s) 380 to the set-top box devices 316, 324. The CFT switch 330 can receive content from the video server(s) 380 and communicate the content to the CPE 314, 322 via the access network 366. The set-top box devices 316, 324 can receive the content via the CPE 314, 322, and can transmit the content to the television monitors 318, 326. In an illustrative embodiment, video or audio portions of the content can be streamed to the set-top box devices 316, 324.

Further, the AQT switch 352 can be coupled to a video-on-demand importer server 358 that receives and stores television or movie content received at the acquisition tier 306 and communicates the stored content to the VoD server 336 at the client-facing tier 302 via the private network 310. Additionally, at the acquisition tier 306, the VoD importer server 358 can receive content from one or more VoD sources outside the IPTV system 300, such as movie studios and programmers of non-live content. The VoD importer server 358 can transmit the VoD content to the AQT switch 352, and the AQT switch 352, in turn, can communicate the material to the CFT switch 330 via the private network 310. The VoD content can be stored at one or more servers, such as the VoD server 336.

When users issue requests for VoD content via the set-top box devices 316, 324, the requests can be transmitted over the access network 366 to the VoD server 336, via the CFT switch 330. Upon receiving such requests, the VoD server 336 can retrieve the requested VoD content and transmit the content to the set-top box devices 316, 324 across the access network 366, via the CFT switch 330. The set-top box devices 316, 324 can transmit the VoD content to the television monitors 318, 326. In an illustrative embodiment, video or audio portions of VoD content can be streamed to the set-top box devices 316, 324.

FIG. 3 further illustrates that the operations and management tier 308 can include an operations and management tier (OMT) switch 360 that conducts communication between the operations and management tier 308 and the public network 312. In the embodiment illustrated by FIG. 3, the OMT switch 360 is coupled to a TV2 server 362. Additionally, the OMT switch 360 can be coupled to an OSS/BSS server 364 and to a simple network management protocol monitor 386 that monitors network devices within or coupled to the IPTV system 300. In a particular embodiment, the OMT switch 360 can communicate with the AQT switch 352 via the public network 312.

The OSS/BSS server 364 may include a cluster of servers, such as one or more CPE data collection servers that are adapted to request and store operations systems data, such as performance data from the set-top box devices 316, 324. In an illustrative embodiment, the CPE data collection servers may be adapted to analyze performance data to identify a condition of a physical component of a network path associated with a set-top box device, to predict a condition of a physical component of a network path associated with a set-top box device, or any combination thereof.

In an illustrative embodiment, the live acquisition server 354 can transmit content to the AQT switch 352, and the AQT switch 352, in turn, can transmit the content to the OMT switch 360 via the public network 312. In this embodiment, the OMT switch 360 can transmit the content to the TV2 server 362 for display to users accessing the user interface at the TV2 server 362. For example, a user can access the TV2 server 362 using a personal computer 368 coupled to the public network 312.

It should be apparent to one of ordinary skill in the art from the foregoing media communication system embodiments that other suitable media communication systems for distributing broadcast media content as well as peer-to-peer exchange of content can be applied to the present disclosure.

Figure 4:
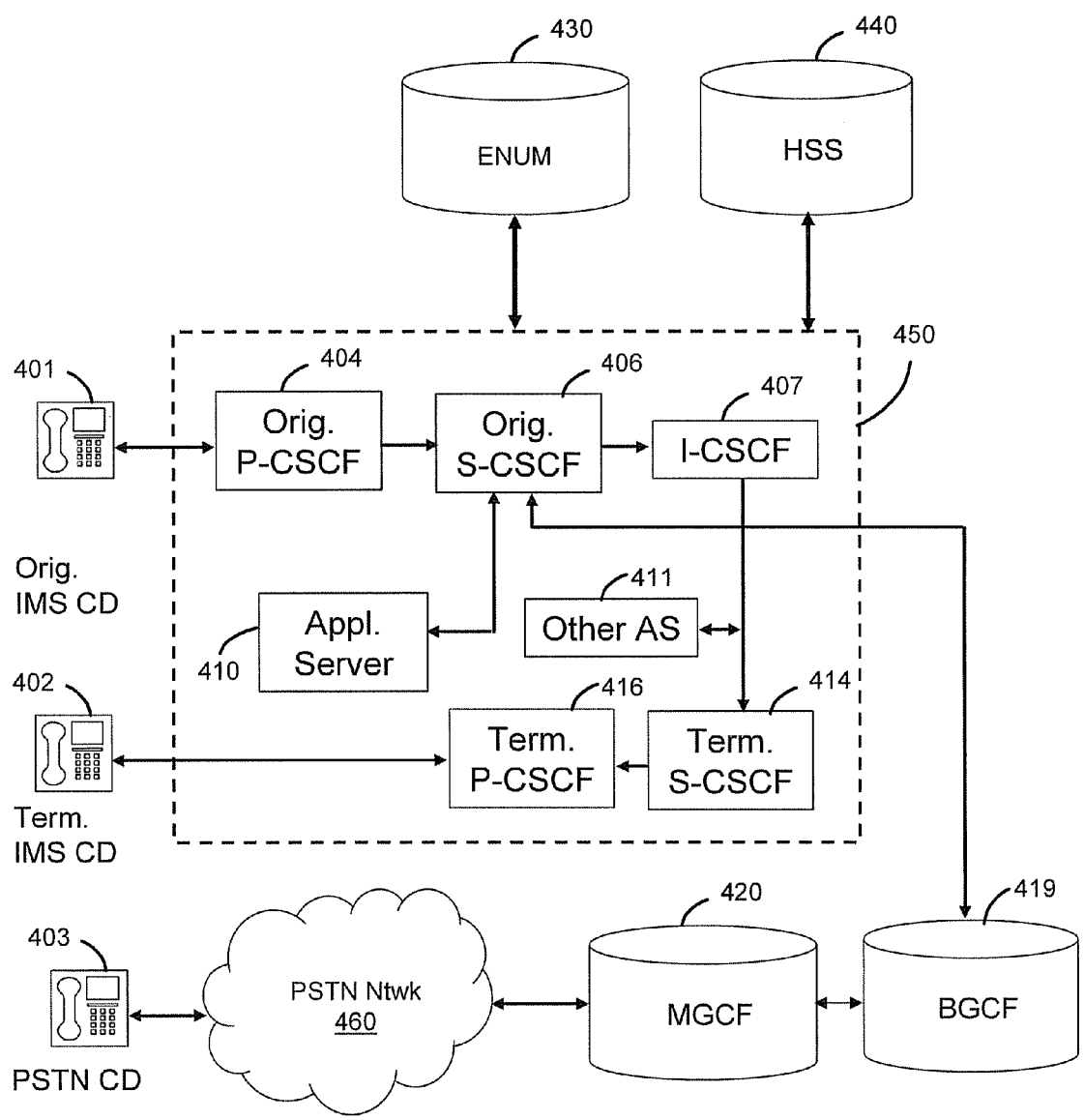

FIG. 4 depicts an illustrative embodiment of a communication system 400 employing an IP Multimedia Subsystem (IMS) network architecture. Communication system 400 can be overlaid or operably coupled with communication systems 100-300 as another representative embodiment of said communication systems.

The communication system 400 can comprise a Home Subscriber Server (HSS) 440, a tElephone NUmber Mapping (ENUM) server 430, and network elements of an IMS network 450. The IMS network 450 can be coupled to IMS compliant communication devices (CD) 401, 402 or a Public Switched Telephone Network (PSTN) CD 403 using a Media Gateway Control Function (MGCF) 420 that connects the call through a common PSTN network 460.

IMS CDs 401, 402 register with the IMS network 450 by contacting a Proxy Call Session Control Function (P-CSCF) which communicates with a corresponding Serving CSCF (S-CSCF) to register the CDs with an Authentication, Authorization and Accounting (AAA) supported by the HSS 440. To accomplish a communication session between CDs, an originating IMS CD 401 can submit a Session Initiation Protocol (SIP INVITE) message to an originating P-CSCF 404 which communicates with a corresponding originating S-CSCF 406. The originating S-CSCF 406 can submit the SIP INVITE message to an application server (AS) such as reference 410 that can provide a variety of services to IMS subscribers. For example, the application server 410 can be used to perform originating treatment functions on the calling party number received by the originating S-CSCF 406 in the SIP INVITE message.

Originating treatment functions can include determining whether the calling party number has international calling services, and/or is requesting special telephony features (such as *72 forward calls, *73 cancel call forwarding, *67 for caller ID blocking, and so on). Additionally, the originating S-CSCF 406 can submit queries to the ENUM system 430 to translate an E.164 telephone number to a SIP Uniform Resource Identifier (URI) if the targeted communication device is IMS compliant. If the targeted communication device is a PSTN device, the ENUM system 430 will respond with an unsuccessful address resolution and the S-CSCF 406 will forward the call to the MGCF 420 via a Breakout Gateway Control Function (BGCF) 419.

When the ENUM server 430 returns a SIP URI, the SIP URI is used by an Interrogating CSCF (I-CSCF) 407 to submit a query to the HSS 440 to identify a terminating S-CSCF 414 associated with a terminating IMS CD such as reference 402. Once identified, the I-CSCF 407 can submit the SIP INVITE to the terminating S-CSCF 414 which can call on an application server 411 similar to reference 410 to perform the originating treatment telephony functions described earlier. The terminating S-CSCF 414 can then identify a terminating P-CSCF 416 associated with the terminating CD 402. The P-CSCF 416 then signals the CD 402 to establish communications. The aforementioned process is symmetrical. Accordingly, the terms "originating" and "terminating" in FIG. 4 can be interchanged.

Figure 5:
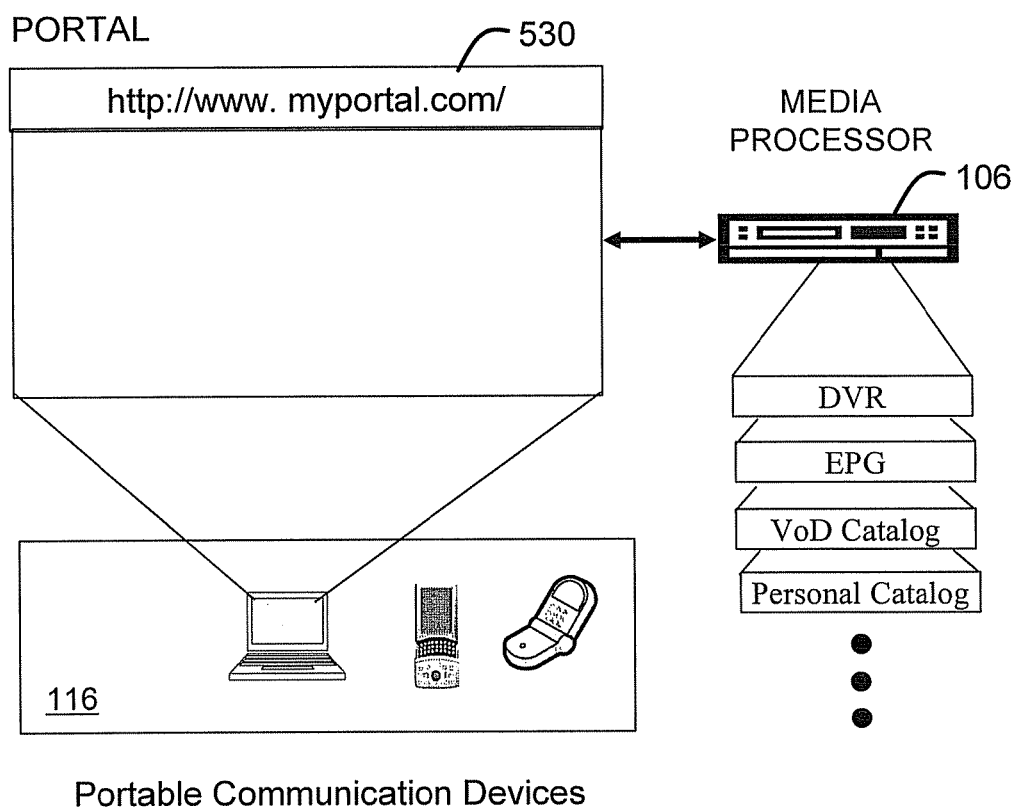
FIG. 5 depicts an illustrative embodiment of a portal interacting with at least one among the communication systems of FIGS. 1-4.

FIG. 5 depicts an illustrative embodiment of a portal 530. The portal 530 can be used for managing services of communication systems 100-400. The portal 530 can be accessed by a Uniform Resource Locator (URL) with a common Internet browser such as Microsoft's Internet Explorer using an Internet-capable communication device such as references 108, 116, or 210 of FIGS. 1-2. The portal 530 can be configured to access a media processor such as references 106, 204, 206, 316, and 324 of FIGS. 1-3 and services managed thereby such as a Digital Video Recorder (DVR), an EPG, VoD catalog, a personal catalog (such as personal videos, pictures, audio recordings, etc.) stored in the STB, a personal computer or server in a user's home or office, and so on.

Figure 6:
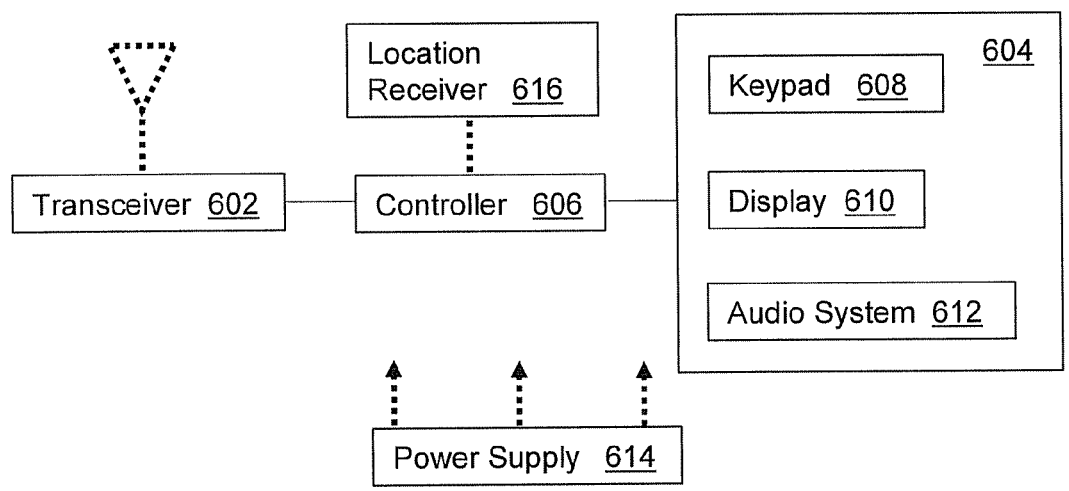
FIG. 6 depicts an illustrative embodiment of a communication device utilized in the communication systems of FIGS. 1-4.

FIG. 6 depicts an exemplary embodiment of a communication device 600. Communication device 600 can be a representative portion of any of the aforementioned communication devices of FIGS. 1-4. The communication device 604 can comprise a wireline and/or wireless transceiver 602 (herein transceiver 602), a user interface (UI) 604, a power supply 614, a location receiver 616, and a controller 606 for managing operations thereof. The transceiver 602 can support short-range or long-range wireless access technologies such as a Bluetooth wireless access protocol, a Wireless Fidelity (WiFi) access protocol, a Digital Enhanced Cordless Telecommunications (DECT) wireless access protocol, cellular, software defined radio (SDR) and/or WiMAX technologies, just to mention a few. Cellular technologies can include, for example, CDMA-1X, UMTS/HSDPA, GSM/GPRS, TDMA/EDGE, EV/DO, and next generation technologies as they arise.

The transceiver 602 can also support common wireline access technologies such as circuit-switched wireline access technologies, packet-switched wireline access technologies, or combinations thereof. PSTN can represent one of the common circuit-switched wireline access technologies. Voice over Internet Protocol (VoIP), and IP data communications can represent some of the commonly available packet-switched wireline access technologies. The transceiver 602 can also be adapted to support IP Multimedia Subsystem (IMS) protocol for interfacing to an IMS network that can combine PSTN and VoIP communication technologies.

The UI 604 can include a depressible or touch-sensitive keypad 608 and a navigation mechanism such as a roller ball, joystick, mouse, and/or navigation disk for manipulating operations of the communication device 600. The keypad 608 can be an integral part of a housing assembly of the communication device 600 or an independent device operably coupled thereto by a tethered wiring interface (such as a USB) or a wireless interface supporting for example Bluetooth. The keypad 608 can represent a numeric dialing keypad commonly used by phones, and/or a Qwerty keypad with alphanumeric keys.

The UI 604 can further include a display 610 such as monochrome or color LCD (Liquid Crystal Display), OLED (Organic Light Emitting Diode) or other suitable display technology for conveying images to the end user of the communication device 600. In an embodiment where the display 610 is touch-sensitive, a portion or all of the keypad 608 can be presented by way of the display. The UI 604 can also include an audio system 612 that utilizes common audio technology for conveying low volume audio (such as audio heard only in the proximity of a human ear) and high volume audio (such as speakerphone for hands free operation). The audio system 612 can further include a microphone for receiving audible signals of an end user.

The power supply 614 can utilize common power management technologies such as replaceable and rechargeable batteries, supply regulation technologies, and charging system technologies for supplying energy to the components of the communication device 600 to facilitate long-range or short-range portable applications. In one embodiment, the device 600 can be a battery-operated mobile multi-mode device. The location receiver 616 utilize common location technology such as a global positioning system (GPS) receiver for identifying a location of the communication device 100, thereby facilitating common location services such as navigation. The controller 606 can utilize computing technologies such as a microprocessor and/or digital signal processor (DSP) with associated storage memory such a Flash, ROM, RAM, SRAM, DRAM or other storage technologies.

Figure 7:
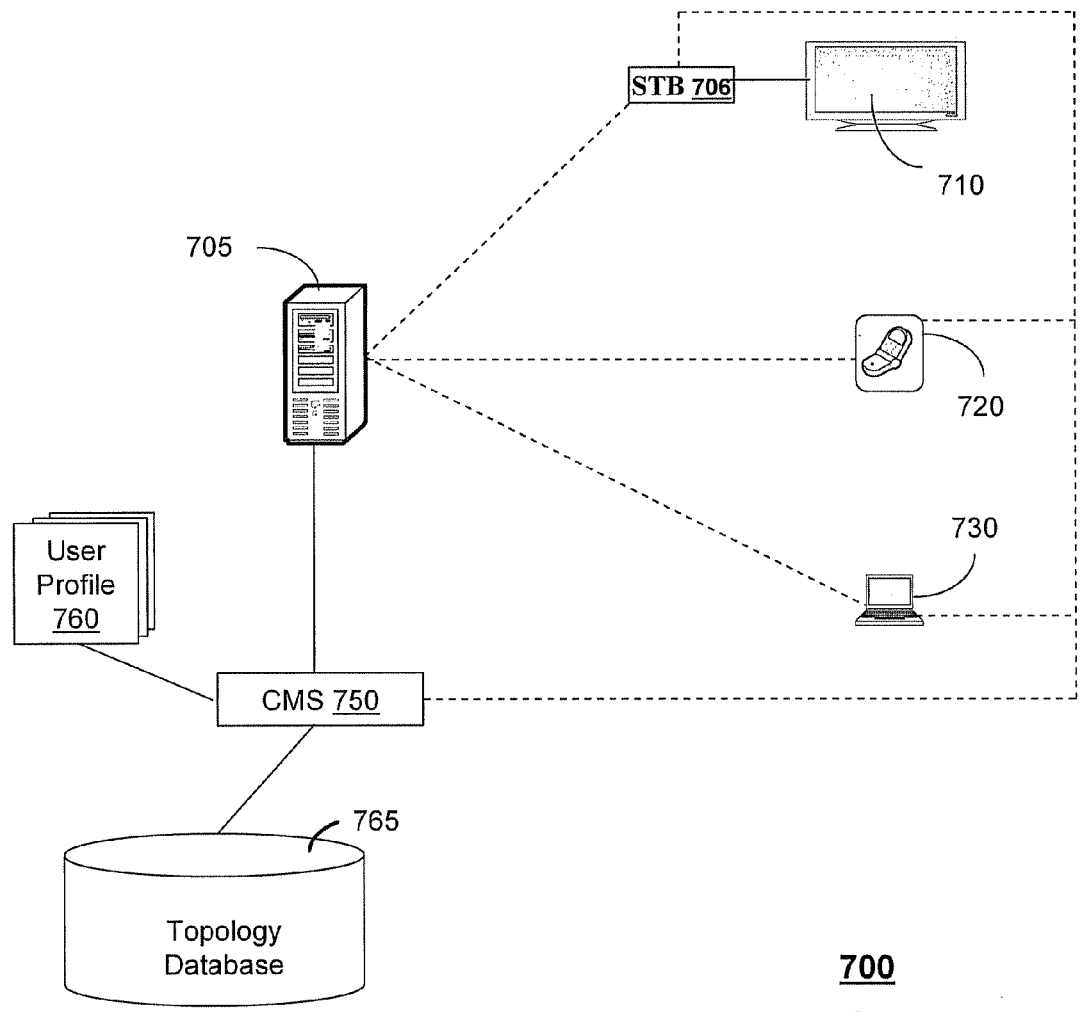
FIGS. 7-13 and 15 depict illustrative embodiments of communication systems that provide media services.

FIG. 7 depicts an exemplary embodiment of a communication system 700 for delivering media content to communication devices associated with a user. The communication system 700 can represent an IPTV broadcast media system with multiple user display devices. Communication system 700 can be overlaid or operably coupled with communication systems 100-400 as another representative embodiment of said communication systems.

System 700 can include a network, such as ISP network 132 of FIG. 1, for delivery of the media content between the provider equipment (such as located at the video head office) and the customer's equipment, such as the gateway located at a residence, mobile phone and so forth. This exemplary embodiment shows a media server 705 for delivery of the media content to a plurality of communication devices, such as STB 706 having display device 710, mobile device 720, and desktop computer 730, which are associated with a user and/or a user group. The present disclosure contemplates various components and configurations being utilized for the delivery of media content, including centralized or distributed configurations. A number of network devices, including Ethernet switches, DSLAMs and other access devices, can be utilized for transmitting the media content from the media server 705 to the communication devices 706, 720, 730. The media server 705 can utilize a number of connection structures for providing a communication link with the communication devices 706, 720, 730, including twisted pair lines, fiber lines and/or wireless connections. For example, a fiber optic coupling can include one GigE and ten GigE links connected to a fiber optic ring, such as a reconfigurable optical add-drop multiplexer (ROADM), which provide media services to a residence via a VHO comprising the media server 705. A portion of the communication devices of the user can receive media content using communication protocols that are different from another portion of the devices, such as a mobile cell phone that receives a video by way of WiFi protocol and a set top box that receives the video by way of a DSL protocol.

System 700 can include a Content Management System (CMS) 750 operably connected to the server 705. The CMS 750 can be in communication with one or more of the communication devices 706, 720, 730 directly and/or through the media server 705. The CMS 750 or portions thereof can be in communication with the media server 705 and/or portions of the network by way of wired and/or wireless links.

The present disclosure contemplates that various components of system 700 can be separate components or one or more of these components can be incorporated together, such as the media server 705 being part of the CMS 750, including running an application thereon that includes, or otherwise has access to, user profiles 760 that are associated with users or groups of users of the communications devices. The present disclosure also contemplates other configurations for communication between the CMS 750 and the media server 705 including a decentralized system and/or a master-slave arrangement between intermediary communication devices coupling the media server with the CMS. The user profiles 760 for the individual users or for groups of users can be maintained and updated and can include various information associated with the user and his or her communication devices, including identification, presence, preferences, purchases, usage history and so forth.

CMS 750 can provide for content personalization and adaptation in a multi-communication device environment, such as for three-screen services (TV, mobile phone, computer of a user). CMS 750 can acquire content from TV broadcast feeds, including continuously or near-continuously, and can index and adapt the content for users according to their interests or desires, such as defined in the user profiles 760. In one embodiment, automatically compiled segments of content can be rendered on a variety of communication devices that the user prefers, including devices that use different communication protocols and/or the same protocol, to facilitate a smoother video consuming experience. CMS 750 can utilize a multimedia content search engine.

In one embodiment, the CMS 750 can be in communication with and/or can be integral with a topology database 765 that includes information related to the topology of the network. For example, the topology database can be utilized for monitoring the dynamic nature of the network topology, such as through retrieving topology database from each of the network elements at various time frames, including at the time of going on-line or in anticipation of going off-line. The topology information can be utilized in combination with presence information associated with the communication devices 706, 720, 730 for applying various location-based rules to the content management, such as determining local restrictions of viewing content and so forth.

Figure 8:
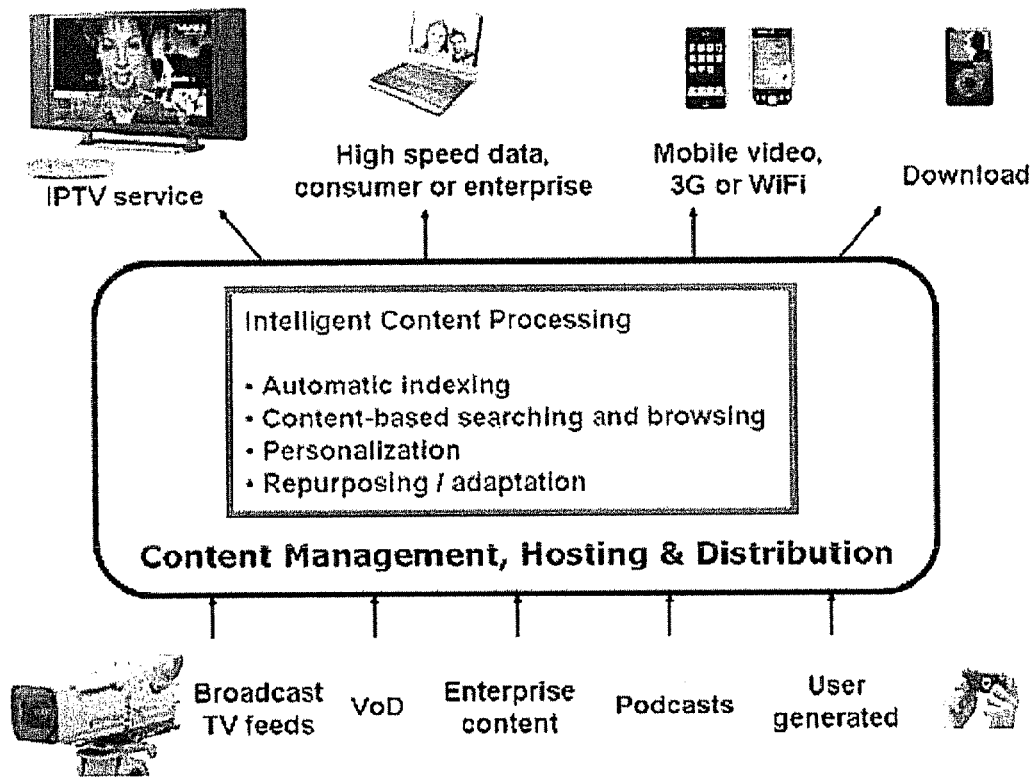

In FIG. 8, a communication system 800 is shown that provides for automated personalized content delivery. Media Content can be obtained from broadcast services, such as continuously, and/or in a capture mode where selected serial content is captured as a set of episodes. In one embodiment, EPG metadata from third party providers can be used to provide high-level metadata, as well as to control the acquisition of the content (such as scheduling recordings). In another embodiment, the program and system information obtained from the broadcast media directly can be used as the source of content descriptions.

In one embodiment, redundant recorders can acquire digitally broadcast content in MPEG-2 format in both standard and high definition. For content that has been published on the web, RSS format can be used to control ingest of MPEG-4 video Podcasts and to provide metadata. The acquired media and metadata can be fed to a group of load-balanced, redundant content processing servers. In one embodiment, additional metadata can be generated using speech recognition, content based video sampling, face detection, and/or multimodal topic segmentation. Related material such as transcripts that are accessible via HTTP can also be obtained and aligned with the media content. In another embodiment, linguistic models can be used for the media processing and can be refreshed, such as daily, using data gathered from the web via RSS news feeds. In another embodiment, a compilation can be generated for each media content asset, the extracted metadata along with all metadata accompanying the source media and any additional metadata derived from web sources, which can be compiled into a summary XML media content description. The source metadata and detailed media processing results can also be maintained as larger XML data structures for applications to access. In one embodiment, the source media can be transcoded into several formats at different spatial and temporal resolutions and bitrates. In another embodiment, programs can be demultiplexed and the audio stream can be transcoded into several representations. In one embodiment, metadata can be embedded into the media streams themselves (such as ID3 tags derived from source EPG metadata and included in transcoded MP3 audio).

System 800 can provide a set of representative images that are extracted from the video to represent the video shots, and a subset of these frames can be used to represent the hierarchal structure of long form video (such as topical clips or chapters). The content personalization engine can identify relevant content from the collections by applying user profiles and generating descriptions of content sets for each user. For instance, users can access their favorite content that is assembled automatically on various rendering devices at a time and location that is convenient for the user.

Figure 9:
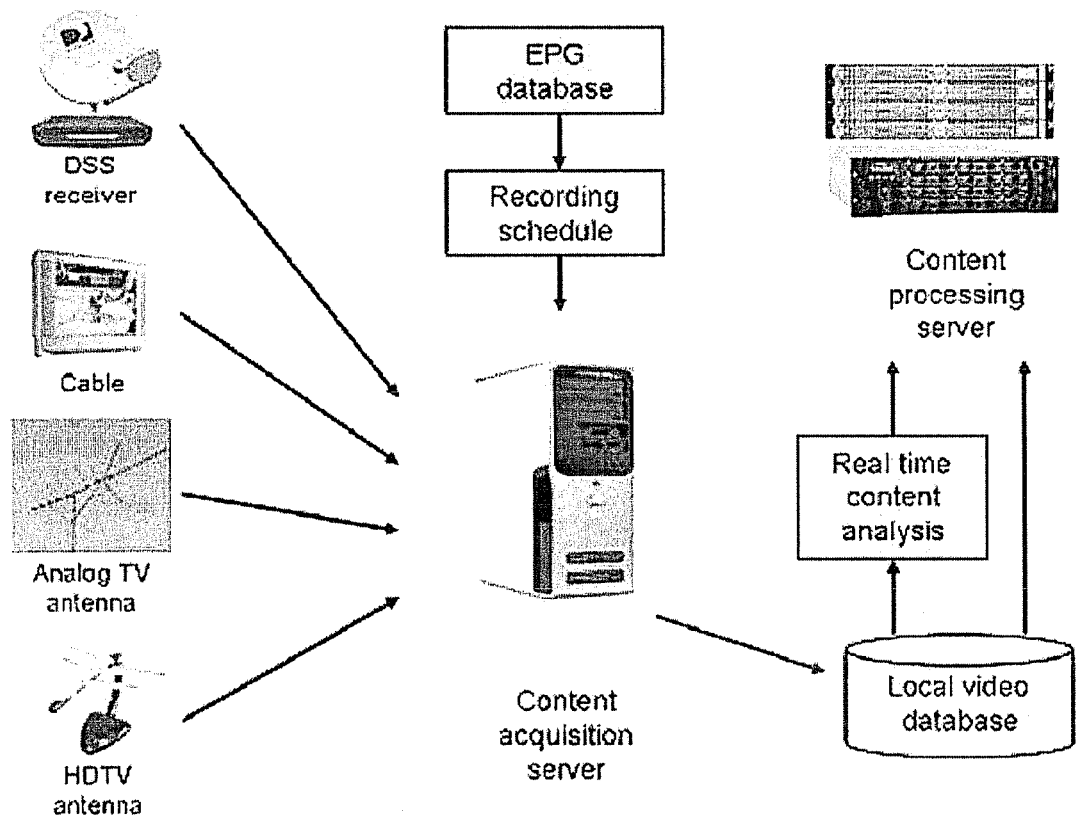

In FIG. 9, a content ingestion module 900 is shown that can be used for retrieving or otherwise obtaining media content. The content ingestion module 900 can be part of a Media Center (MCE) platform. For example, the MCE machine can be a full fledged Personal Video Recorder (PVR) system, having the capability to schedule a single or a series of recordings of TV programs with integrated EPG support. In one embodiment, the MCE can record a television show in DVR-MS file format or an Advanced Streaming Format (ASF). The format can provide enhancements to allow for the creation of PVR functionalities, including time-shifting, live pause, and simultaneous record and playback. EPG data can be obtained by a combination of local and commercial feeds and can make use of a database to store it.

Module 900 provides for ease of handling on one side multiple EPG formats and on the other side complex queries can be handled efficiently. The MCE provides easy access to the EPG, and recordings can be scheduled manually in a series of mouse clicks or automatically based on the user profile. For example, all programs for a selected set of channels can be recorded. Several TV signal inputs can be monitored, including DBS (DSS), analog cable TV, analog terrestrial TV broadcasting, and over-the-air digital video broadcasting (ATSC DTV). Tuning the channels can be automatically accomplished according to the recording schedules. In one embodiment, the acquisition system can record Standard Definition TV (SDTV) with resolution 704.times.480, and HDTV with resolution up to 1920.times.1080. The MCE can provide several choices of recording quality control to meet various storage constraints.

Acquisition servers can be configured to record the best quality video (such as 3 GB/hour). The high quality recording provides benefit in that the quality of the transcoded lower resolution/bit rate videos is improved and the content processing algorithms perform better on cleaner data. In one embodiment, some of the content processing can be applied on the content acquisition servers in real time depending on their computational capabilities, such as boundary detection and low bit rate video transcoding.

Figure 10:
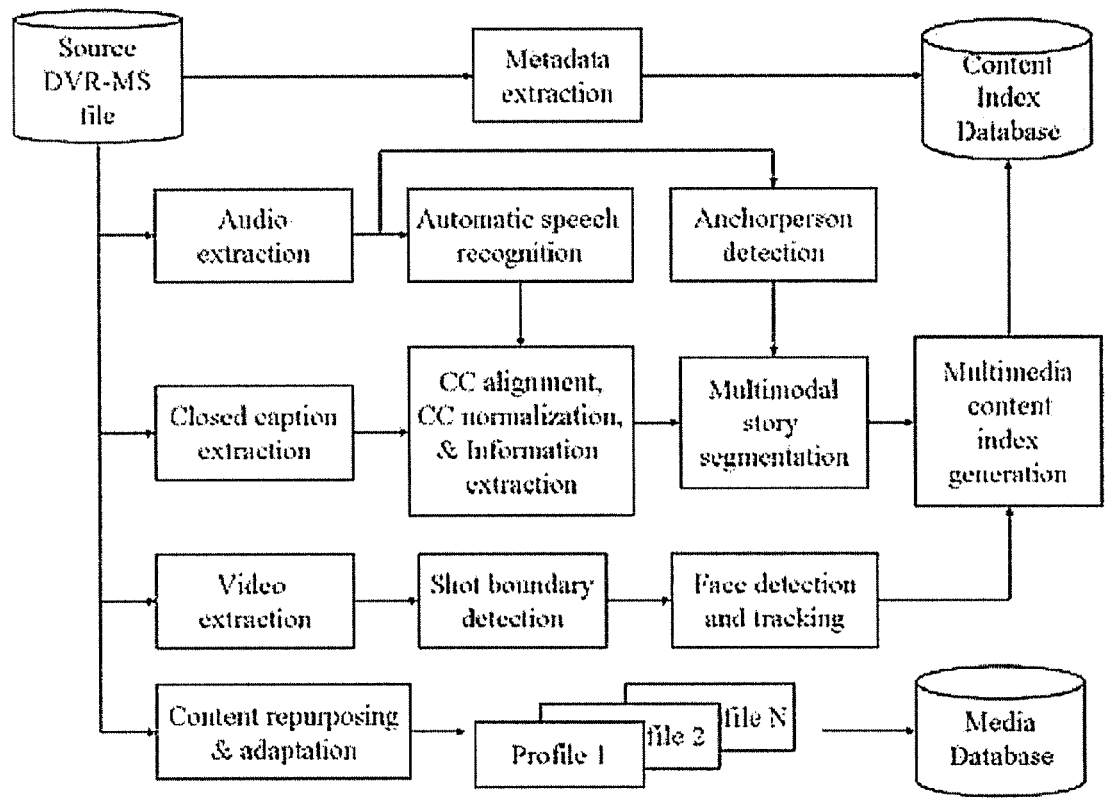

In FIG. 10, a content processing module 1000 is shown that can perform processing to extract a semantically meaningful index to facilitate query response and to repurpose the media in different format and bit rate for personalized service. In one embodiment, the source of the processing module 1000 can be a DVR-MS file, and the processing results can be stored in databases, such as a media database for serving the content and a content index database for content query purposes. In one embodiment, the metadata in the DVR-MS can include various information about the programming (such as a TV show), including the program ID, the broadcast time, and some brief description of the content coming from the EPG. In another embodiment, the metadata can be extracted and saved in the content index database, and a key can be created to identify corresponding content.

While a high quality motion video can provide a better viewing experience and may carry more information, in some cases video replay is either not an option, or may be too costly. A different visual presentation of the video content can be provided by one or more of the exemplary embodiments by selecting a subset of representative frames to convey the visual information. For instance, a shot boundary detection algorithm can be employed. This algorithm can detect abrupt and gradual transitions in the video sequence, and the set of frames retained can generate a compact representation of the video program.

In one embodiment, closed caption (CC) can be used to search for appropriate video clips since the CC contains rich content information about the program. CC is normally not synchronized with the audio, which can noticeably affect the quality of video browsing and retrieval. For short segments where accurate transcriptions are available, forced alignment can be used to obtain accurate timing information. In one embodiment, a grammar can be dynamically built for each short segment of text (closed caption lines are typically less than 32 characters) with garbage models before and after the text. In another embodiment, alignment can be achieved by running Large Vocabulary Automatic Speech Recognition (LVASR) to produce a 1-best transcription and then using dynamic programming to find an optimal word-level alignment by minimizing the word-edit-distance. Subsequent processing can be used to derive sentence-level timestamps for use by applications and the topic segmentation algorithm. This method can be robust to both ASR word errors and closed captioning paraphrasing or omissions, but misalignments do sometimes occur and a post processing phase can be used to detect these errors as large shifts relative to the original closed caption timestamps and corrects them using the mean delay. CC and ASR transcripts may not have case information, and the text normalization module can use a rule-based capitalization algorithm trained from multiple sources, including AP newswire data and online stories published by national media companies.

In one embodiment, to better index and present the content, named entities, including country names, person names, locations, titles, etc. can be extracted from the textual stream. The presence of an anchorperson can be a cue to the location of the topic or story boundary. With knowledge of which key frames contain anchorpersons, one or more of the exemplary embodiments can render user interfaces without redundancy by selecting only a single image of the anchorperson. The multimodal story segmentation can identify the news story boundaries based on closed caption cues, textual information, speaker boundaries, and anchorperson location. Once the story boundaries are located, personalized service can be easily built.

The content structure generation block can be the place where all content index information is combined and a page/paragraph structure of the media is created. Each paragraph is composed of a representative keyframe from selected shots and a set of related CC sentences. Such structure can effectively represent the video data in a manner that is easy for users to browse the content nonlinearly. A wide range of accessing devices with different network and video rendering capabilities can exist. The DVR-MS files can be transcoded to various formats, such as Windows Media Video (WMV) formats including standard definition (SD) video (2 Mbps/640×480/29.97 fps), VHS quality video (600 Kbps/320×240/29.97 fps), and low bandwidth (LB) video (150 Kbps/224×168/15 fps), as well as MP4 format: (600 kps/320×240/29.97 fps). For example, the user can enjoy the best quality DVR-MS video on the big screen TV in the living room, or various bit rate WMV videos on a modern desktop PC, or playback MP4 video on an iPhone on the road. Various video content analysis can be performed by one or more of the exemplary embodiments including shot boundary detection, anchorperson detection, and story segmentation.

Figure 11:
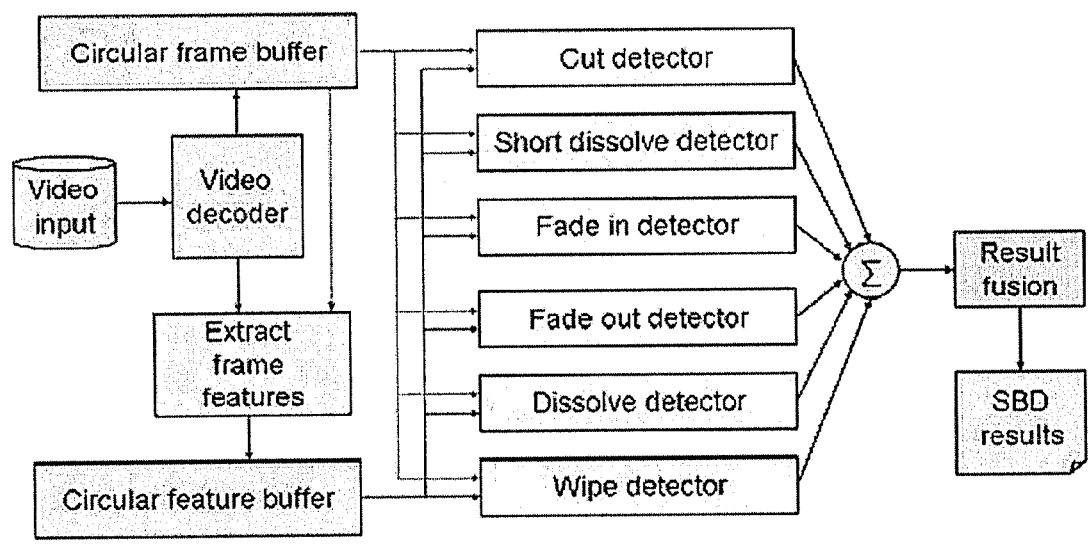

In FIG. 11, a shot boundary system is shown that can perform visual feature extraction, shot boundary detectors, and result fusion. The top level of the algorithm can run in a loop, and every loop can process one video frame. Each new frame and the associated visual features can be saved in circular buffers. The loop can continue until all frames in the video file are processed. In one embodiment, multiple independent detectors can be utilized, which target for dominant types of shot boundaries in the SBD task, such as fade in, fade out, fast dissolve (such as less than 5 frames), dissolve, and wipe. In one embodiment, each detector can be a finite state machine (FSM), which may have different numbers of states. The results of all these detectors can be fused and the overall SBD result can be generated in the required or desired format.

In one embodiment, in order to reduce the computational complexity, video input can be scaled down, such as to a resolution of 320.times.240. For each frame, the one or more exemplary embodiments can extract a set of visual features, which can be classified into two types: intra-frame and inter-frame visual features. The intra-frame features can be extracted from a single, specific frame, and they can include color histogram, edge, and related statistical features. The inter-frame features can rely on the current frame and one previous frame, and they can capture the motion compensated intensity matching errors and histogram changes. The visual features can be extracted from a region of interest (ROI), such as a central portion of the picture.

For instance, the ROI can be 288×192 pixels in size. Within the ROI, the one or more exemplary embodiments can extract the histogram of red, green, blue, and intensity channels, and can compute a set of statistics, including the mean, the variance, the skewness (the $3^{rd}$ order moment), and the flatness (the $4^{th}$ order moment). For each pixel in the ROI, the one or more exemplary embodiments can compute its discontinuities in the horizontal (with respect to vertical) direction, such as by using Sobel operators. If the value is higher than a preset threshold, the pixel can be labeled as horizontal (respectively, vertical) edge pixel.

The one or more exemplary embodiments can use the ratio of the total number of horizontal (respectively, vertical) edge pixels to the size of ROI as an edge based feature. The temporal derivative (delta) of a feature can be fitted by a second order polynomial to make it smooth. The delta values of histogram mean, variance, and dynamic range can be computed as additional visual features. Motion features can be extracted based on smaller blocks within the ROI. The one or more exemplary embodiments can split the ROI into 24 blocks (6 by 4), each with the size 48×48 pixels. The search range of motion vector for each block can be set to 32×32. Either an exhaustive search for better accuracy or a hierarchical search for higher efficiency can be used to estimate a blocks motion vector. The motion features for each block, such as block k, can include the motion vector (MVk), the best matching error (MEk), and the matching ratio (MRk). The matching ratio is the ratio of the best matching error with the average matching error within the searching range, and it measures how good the matching is. The value is low when the best matching error is small and the block has significant texture.

Based on the motion features of all blocks, the one or more exemplary embodiments can select the dominant motion vector and its percentage (the ratio of the number of blocks with this motion vector to the total number of blocks) as frame level features. The one or more exemplary embodiments can rank all MEk ("MRk"), and compute the order statistics, including the mean, MEA; the median, MEM; the average of the top ⅓, MEH; and the average of the bottom ⅓, MEL ("MRA", "MIM", "MM", "MRL").

These features can be effective in differentiating the localized visual changes (such as foreground changes only) from the frame wised visual changes. For example, high MRH with low MRA can indicate a localized transition. Based on the motion vectors of all blocks, the one or more exemplary embodiments can determine the dominant motion vector and the percentage of blocks whose motion vectors are the same as the dominant one. If the dominant motion vector is non-trivial and the percentage is significant (such as more than ⅓), a global motion flag can be set to true for the frame, otherwise, false. To cope with the false shot boundaries introduced by zooming effects, the one or more exemplary embodiments can develop a simple yet effective zooming detector. For each frame, the one or more exemplary embodiments can extract the intensity values for the center row and center column.

Dynamic programming can be used to search the optimal match between the center rows (and the center columns) of adjacent frames. Using single pixel wide center rows (and center columns), the one or more exemplary embodiments can find possible horizontal (vertical) zooming factors efficiently. The entire frames can then be used to verify the validity of these zooming factors. If the validation passes, the zooming flag can be set to true, otherwise, false. The SB detectors of system 1100, can detect 6 common shot boundaries: cut, fast dissolve (less than 5 frames), fade in, fade out, dissolve, and wipe, where these 6 types of transitions can cover most shot transitions in video sequences and they can be detected relatively reliably.

Figure 12:
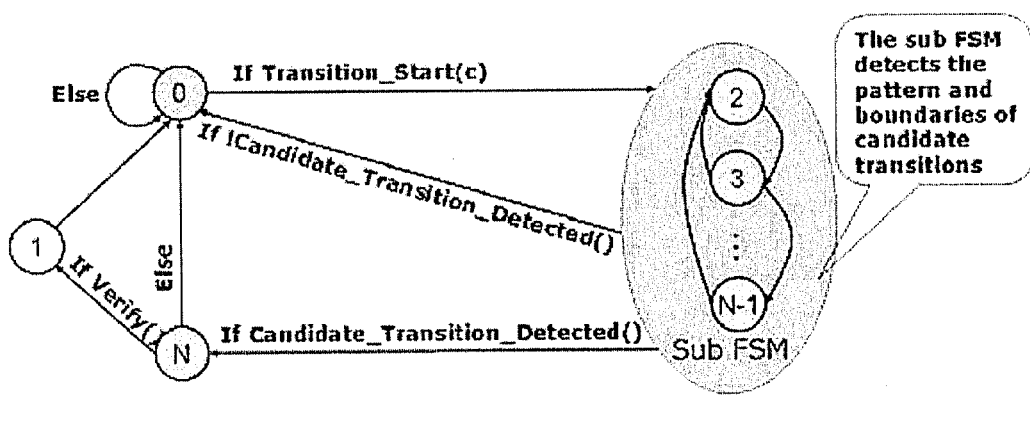

In FIG. 12, the general FSM structure 1200 for all shot boundary detectors is shown. State 0 is the initial state. When the transition start event is detected, the detector enters the sub FSM, which detects the target transition pattern, and locates the boundaries of the candidate transition. If the sub FSM fails to detect any candidate transition, it returns to state 0, otherwise, it enters state N. State N further verifies the candidate transition with more strict criteria, and if the verification succeeds, it transfers to state 1, which indicates that a transition is successfully detected, otherwise, it returns to the initial state. Although the SB detectors share the same general FSM structure, their intrinsic logic and complexity is different. The state of the FSM can be determined by a set of state variables. There are three basic state variables that are common for all FSMs: state_id, which is the state of current FSM, start_frame, which is the last frame of previous shot, and end-frame, which is the first frame of the new shot. Different detectors have additional state variables computed based on frame visual features to track the transition of states.

For transition verification, the one or more exemplary embodiments can apply both threshold based and support vector machines (SVM) based methods. SVMs can greatly reduce training time by analyzing only marginal samples. In one embodiment, radial basis functions can be evaluated in a 3-fold validation process. The exemplary embodiments can search linear settings and RBF settings with random subsets of the training set being split, such as into 80/20 training/testing partitions. All features can be globally normalized to one before they are analyzed by the SVM. In one embodiment, fusion of detector results can be conducted on-the-fly with low latency. The one or more exemplary embodiments can sort the list of initial detection results reported by all detectors in their temporal order and merge all overlapped fade out and fade in transitions into a single FOI (Fade out in) transition. Then the overlapped transitions can be removed based on their priorities. The adopted priority order can be (from highest to lowest) FOI, dissolve, fast dissolve, cut, and wipe. Based on the SBD results, one keyframe can be selected as the representative image for each shot. In one embodiment, the third frame within each shot can be chosen as the keyframe.

Figure 13:
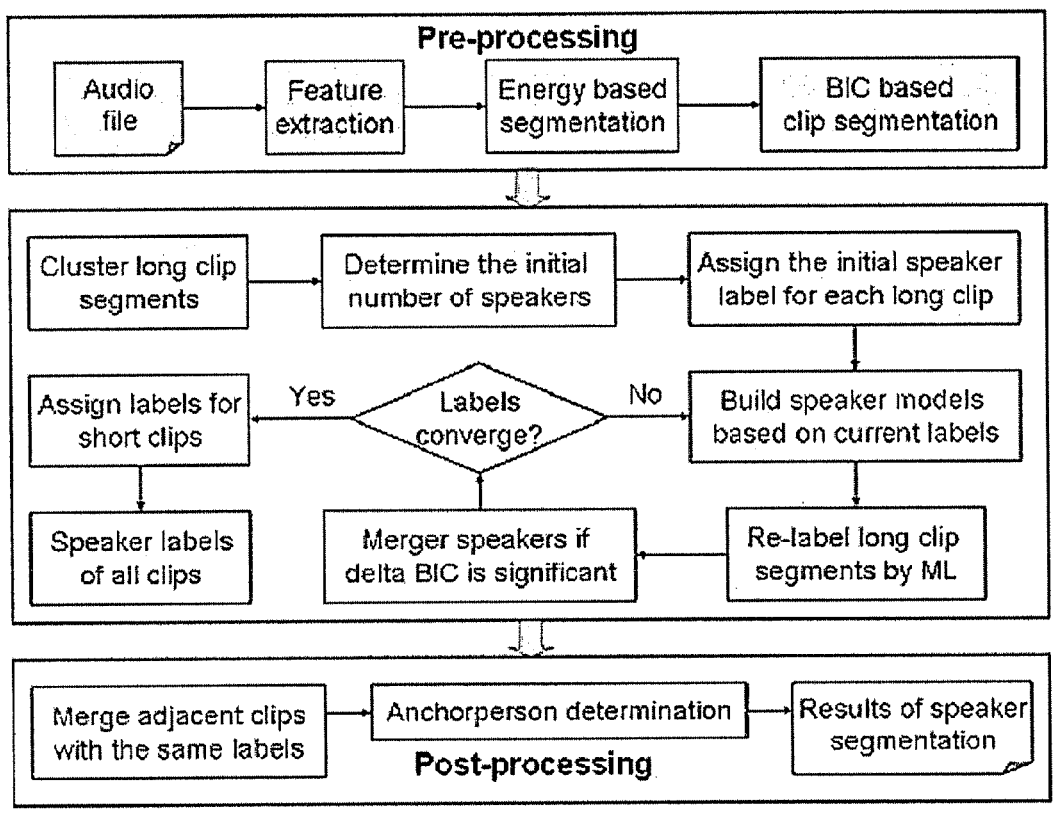

In FIG. 13, an anchorperson detection process 1300 is shown. The anchorperson appearance can provide semantically meaningful cues for content analysis. For example, in typical news reporting, each story is introduced by the anchorperson, fully covered by one or more reporters and interviewees, and then may or may not be summarized by the anchorperson. In preprocessing using process 1300, the audio can be first segmented into short segments on phoneme level, where the duration of each segment is in the range of 200 ms to 1 second, based on energy. Then these short segments can be grouped into audio clips, which are about 3 seconds long. To prevent cases where one clip contains multiple speakers' speech, one or more of the exemplary embodiments can employ Bayesian Information Criteria (BIC) based on MFCC features to align the clip boundary to the local maxima of delta BIC values computed based on two adjacent sliding windows.

In another embodiment, to extract reliable statistics, the one or more of the exemplary embodiments may only consider clips that are longer than 2 seconds. For the set of long clips, the one or more of the exemplary embodiments can use the delta BIC values as their distance. Based on the distance matrix, a hierarchical agglomerative clustering (HAC) algorithm can be applied to cluster the long clips using a pre-selected threshold. Each dominant cluster whose total duration is more than 2 minutes can be treated as a main speaker, and the clips belonging to that cluster can be collected to train a Gaussian mixture model (GMM) for that speaker. All of the small clusters that are not labeled as main speakers can be grouped together as the background speaker. The set of speaker models can be used to relabel all long clips by maximum likelihood (ML) method. The one or more of the exemplary embodiments can compute the delta BIC values between any pair of speakers as a similarity measure. If the delta BIC between two speakers is lower than a preset threshold, two speakers can be merged. This loop can continue until the speaker labels of all clips converge, or the maximum number of loops is reached. The speaker models can be used to label the short clips, such that all clips have speaker labels. The post-processing step can merge adjacent clips with the same speaker labels, and can smooth the segments that are too short, such as less than 300 ms. Short segments can be merged into the longer neighboring segments. For each speaker, the one or more of the exemplary embodiments can measure the total duration of his/her speech and the standard deviation (STD) of the locations of all his/her speech segments. Speakers whose speech duration and speech STD exceed certain levels can be determined to be anchorpersons.

In one embodiment, news programs can be segmented into "coherent" regions so that a search engine will return to the user video clips of interest based on keyword search and/or relevance feedback. Retrieving items of interest can include returning the video clips that cover one topic. Relevance feedback can be an iterative technique that returns items of interest to the user based on the following procedure: 1) initially return to the user a set of video clips (or text) based on keyword search such as ten clips being returned to the user and the user marking clips of interest; 2) based on the marked and unmarked clips, constructing a learning machine which returns more clips of interest; 3) repeating step two until finished. Relevance feedback has been shown to be a very powerful technique for returning items of interest. Each item may cover only one topic. The news segment can be segmented "on-the-fly", that is, based on a keyword search, finding the news programs that contain that keyword and then segmenting them into coherent regions. In another embodiment, pre-segmenting of news programs can be performed into coherent segments such that the search may go much faster. In another embodiment, the time aligned closed-captions and the audio can be used to do this segmentation. The exemplary embodiments can use various features to segment the news programs, including: (1) a maximum sum of densities; (2) speaker turn indicators; and (3) anchorperson probability.

In one embodiment, an input can include a set of sentences corresponding to the program dialog transcription for a program unit between commercial breaks, such as from the processed closed caption. For non-commercial content, the entire program text may be used, with slightly lower accuracy. The closed caption transcriber can generate punctuation, which can be used to break the closed caption stream into sentences. The exemplary embodiments can use the following algorithm to determine topic boundaries: 1) use a part-of-speech tagger to mark all nouns; 2) stem all nouns to their roots; 3) define $S(i, j)=1$ if sentences i and j $0>i$) have at least one word in common, otherwise zero where S is therefore an upper diagonal matrix (diagonal elements are zero); 4) define a density between sentences i and j using cross-validation; 5) using dynamic programming, find the set of sentences such that the sum of the densities is maximized and where the number of segments K is obtained from the dynamic programming algorithm. The sentences marking the boundaries of the segments can then be obtained. If there were no commercials, the exemplary embodiments can use the entire program and segment it based on density. However, if commercials are present, the density estimation can be determined based on each segment between commercials. The density indicator feature can be a binary feature, where for sentences that are segment boundaries, the values are true, otherwise, false.

In one embodiment, the closed caption transcriber can be used where the speaker changes (the ">>" markers in CC). If the CC is not available, the exemplary embodiments can use the speaker boundaries extracted as described above. The turn indicator feature can be a binary feature. If there is speaker change within the sentence, the value is true, otherwise, false. The exemplary embodiments can assign an anchor probability as the ratio of the time within a time-marked sentence that the anchorperson is present within that sentence to the total time of the sentence. If this probability is greater than 0.5, then the anchorperson is determined to be speaking. Each sentence can be characterized by a number of nine features, including: the density indicator, the speaker turn indicator, and the anchorperson probability of the current sentence and the same features for the previous sentence and the next sentence. Based on these features, the exemplary embodiments can use SVM classifier with quadratic kernel to determine whether a sentence is a story boundary or not.

In one embodiment, the ingested and processed assets can be stored in collections for a range of applications such as video search, personalization and video data mining research. For content personalization applications, an additional system component can manage user registration and can capture user content preferences including preferred content sources for each topic of interest.

Figures 14, 15:
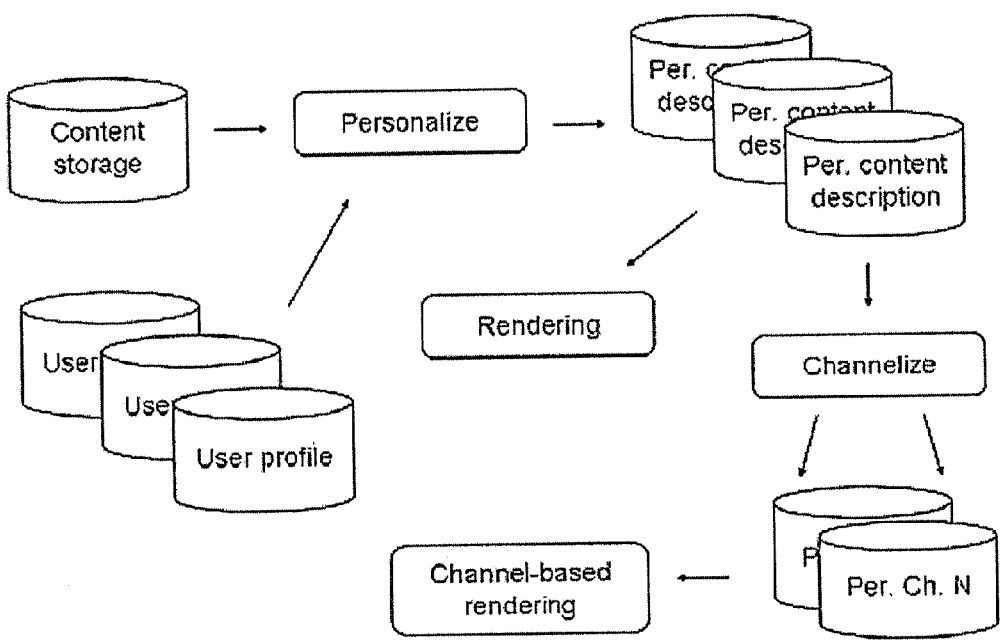
FIG. 14 depict an illustrative embodiment of a graphical user interface of the communication systems of FIGS. 7-13 and 15 that provide media services.

In FIG. 14, a centralized user interface 1400 can allow users to specify contact information for alerting applications and can indicate which devices they would like to use to access the content. This interface can also be used to manage subscriptions to the users' personalized channels. For example, users can click a button to subscribe to a personalized audio or video Podcast using iTunes. The users' content preferences are captured in an XML representation, and for interoperability, this may be easily transformed into MPEG-7 as specified in TV-Anytime. A personalization engine can identify relevant content from the collections by applying the user profiles and can generate descriptions of content sets for each user. At the most basic level, these can be ordered lists of content identifiers (such as playlists) but for long form content sources, these can include offset and duration information based on topic and commercial segmentation and behave like rudimentary edit decision lists.

To support a wide range of applications, the personalized content descriptions can support a rich set of metadata beyond that which is necessary to simply retrieve and queue up the media. For each relevant asset, the exemplary embodiments can include a copy of the global metadata, a set of keywords which summarize the relevant segment, synchronized dialog, and pointers to thumbnail images that represent the segment. In other embodiments, relevance engines can also be employed to guide the selection of relevant clips. The personalized XML format content descriptions for each user can be small (typically less than 200 kilobytes) and are used for a wide range of applications.

In FIG. 15, a personalization architecture 1500 is shown. In one embodiment, intermedia adaptation is employed to adapt the metadata as well as the content in some cases. For example, by demultiplexing the audio, and selecting a set of representative images and metadata, the exemplary embodiments can create a form that can easily be packaged as an enhanced podcast for replay on less capable devices, and which facilitates consumption during multitasking activities of a user, such as exercise. In another embodiment, XSLT can be used to provide efficient and scalable metadata manipulation and rendering (such as into RSS XML and HTML). In one embodiment, applications may read the personalized content description markup directly and extract relevant portions using XPATH or XML DOM parsers. For many applications, such as creating personalized podcasts, or mapping to set-top consumption contexts, a channel model can be a natural paradigm. For these applications, the service provided by architecture 1500 can create multiple channels for each user, one for each topic of interest, as opposed to a single personalized channel. This allows for the familiar channel navigation subsystems such as RSS readers and interactive program guides to be easily utilized for content browsing. To account for content originating from multiple broadcast channels or RSS feeds, architecture 1500 can insert an identifier of the original broadcast source of the content into the metadata describing the personalized content.

For content consumption on laptops or other devices with highly capable input modalities including keyboard and mouse, the exemplary embodiments can create interfaces that allow the user to either view the content in a passive mode, or to interact with the content. Users can easily skip over content that is not of interest, and can edit the playlists simply by checking a box next to each clip. This interface supports client side scripting for a rich interactive user experience. The present disclosure also contemplates implementing an interface based on the declarative UI markup language XAML which allows plugins to efficiently render advanced video effects within browsers including scaling, overlays, rapid start, and UI animation.

For content consumption on televisions, the user input capabilities can be reduced. Further, set-top boxes having limited processing capabilities can be addressed using a Remote Desktop Protocol (RDP) architecture with streaming video, such as Windows Media Format video. With RDP, an HTML interface can be rendered on a server and the resulting bitmap transferred to the set top box. This permits applications to make use of a fully capable browser, while keeping the load on the server to a minimum in order to allow the service to scale to support a large number of users in a cost effective manner. The users can easily navigate using the remote arrow keys. This includes supporting Media Center PCs and gaming platforms. The exemplary embodiments can deliver lower bit rate video in a streaming mode if the network throughput is not sufficient for full HD or SD quality video.

Figure 16:
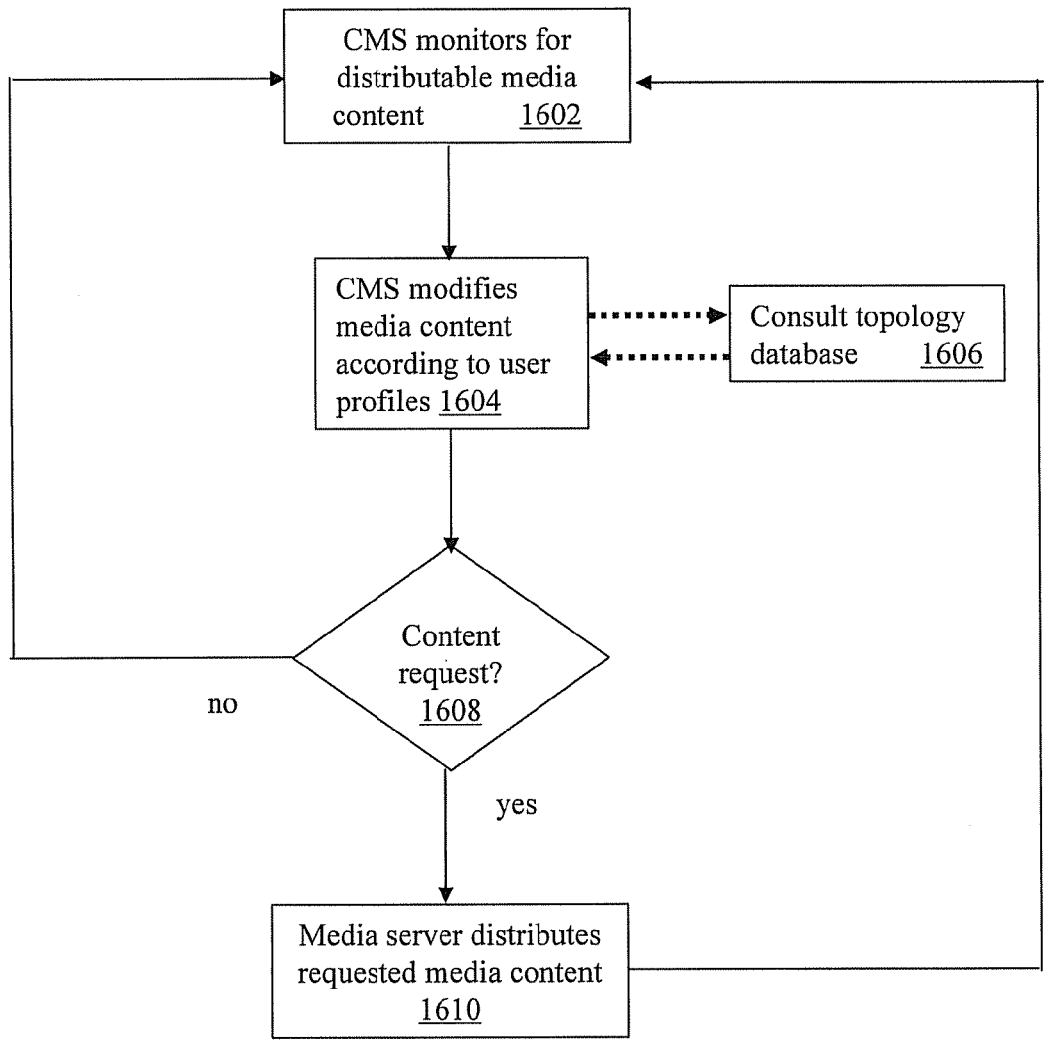
FIG. 16 depicts an illustrative embodiment of a method operating in portions of the communication systems of FIGS. 1-4, 7-13 and 15.

FIG. 16 depicts an exemplary method 1600 operating in portions of the various communication systems described herein. Method 1600 has variants as depicted by the dashed lines. It would be apparent to an artisan with ordinary skill in the art that other embodiments not depicted in FIG. 16 are possible without departing from the scope of the claims described below.

Method 1600 can begin with step 1602 in which the CMS 750 monitors for distributable media content. In step 1604, the CMS 750 can modify the media content based upon user profiles associated with users or groups of users, which can include preferences, formats, presence information and so forth. The modifications can include packaging media content into previews for the user based on the above-described processes. The CMS 750 can obtain topology information in step 1606 from the topology database, which can be utilized for the distribution of the media content. For instance, presentation restrictions can be applied and network latency can be determined for more efficient delivery to the user's communication devices.

In step 1608, the method can determine if a request for distribution has been made by a user device. If so, then the media server can distribute the requested media content as adjusted by the CMS 750, otherwise the method can return to monitoring for the new media content to be distributed.

From the foregoing descriptions, it would be evident to an artisan with ordinary skill in the art that the aforementioned embodiments can be modified, reduced, or enhanced without departing from the scope and spirit of the claims described below. For instance, the user profiles can be based on information provided by the user before adapting the media content and/or can be based on information provided at other times, including when new media content is first acquired. In one embodiment, the user profiles can be based on monitored behavior of the user, including monitored preferences and so forth.

These are but a few examples of the modifications that can be applied to the present disclosure without departing from the scope of the claims. Accordingly, the reader is directed to the claims for a fuller understanding of the breadth and scope of the present disclosure.

Figure 17:
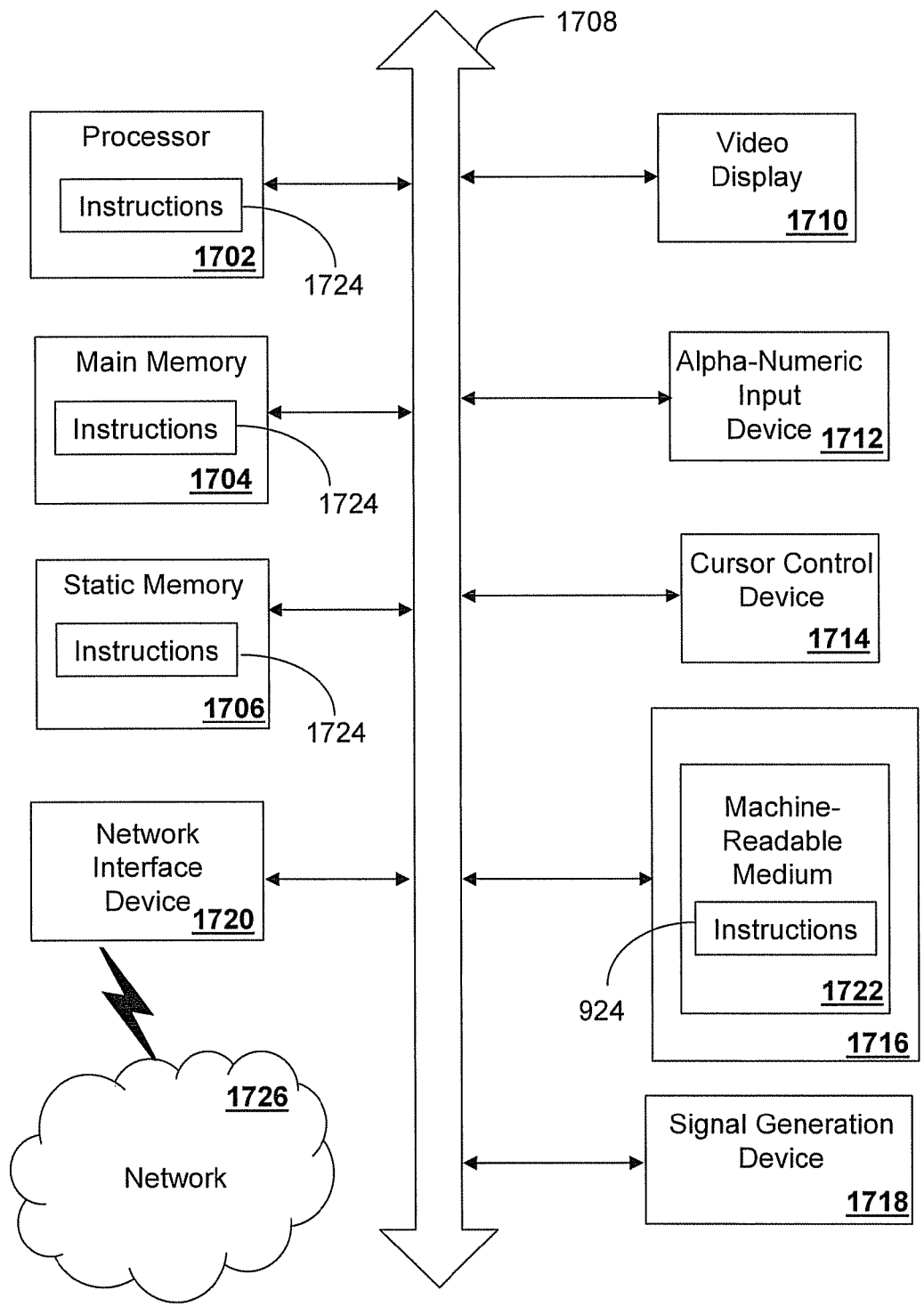
FIG. 17 is a diagrammatic representation of a machine in the form of a computer system within which a set of instructions, when executed, may cause the machine to perform any one or more of the methodologies discussed herein.

FIG. 17 depicts an illustrative diagrammatic representation of a machine in the form of a computer system 1700 within which a set of instructions, when executed, may cause the machine to perform any one or more of the methodologies discussed above. In some embodiments, the machine operates as a standalone device. In some embodiments, the machine may be connected (using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 1700 may include a processor 1702 (such as a central processing unit (CPU)), a graphics processing unit (GPU, or both), a main memory 1704 and a static memory 1706, which communicate with each other via a bus 1708. The computer system 1700 may further include a video display unit 1710 (such as a liquid crystal display (LCD)), a flat panel, a solid state display, or a cathode ray tube (CRT)). The computer system 1700 may include an input device 1712 (such as a keyboard), a cursor control device 1714 (such as a mouse), a disk drive unit 1716, a signal generation device 1718 (such as a speaker or remote control) and a network interface device 1720.

The disk drive unit 1716 may include a computer-readable medium 1722 on which is stored one or more sets of instructions (such as software 1724) embodying any one or more of the methodologies or functions described herein, including those methods illustrated above. The instructions 1724 may also reside, completely or at least partially, within the main memory 1704, the static memory 1706, and/or within the processor 1702 during execution thereof by the computer system 1700. The main memory 1704 and the processor 1702 also may constitute computer-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 1724, or that which receives and executes instructions 1724 from a propagated signal so that a device connected to a network environment 1726 can send or receive voice, video or data, and to communicate over the network 1726 using the instructions 1724. The instructions 1724 may further be transmitted or received over a network 1726 via the network interface device 1720.

While the computer-readable medium 1722 is shown in an example embodiment to be a single medium, the term "computer-readable medium" should be taken to include a single medium or multiple media (such as a centralized or distributed database, and/or associated caches and servers) that store the one or more sets of instructions. The term "computer-readable medium" shall also be taken to include any medium that is capable of storing, encoding or carrying a set of instructions for execution by the machine and that cause the machine to perform any one or more of the methodologies of the present disclosure.

The term "computer-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and/or a digital file attachment to e-mail or other self-contained information archive or set of archives is considered a distribution medium equivalent to a tangible storage medium. Accordingly, the disclosure is considered to include any one or more of a computer-readable medium or a distribution medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (such as TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. Section 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter. The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A machine-readable storage device, comprising executable instructions that, when executed by a processing system including a processor, facilitate performance of operations, comprising:
   detecting media content responsive to monitoring for distributable media content from a first source;
   adjusting the media content as adjusted media content for distribution to a plurality of communication devices that are associated with a user, wherein the adjusting is based on a user profile associated with the user, wherein a first set of the plurality of communication devices communicate by way of communication protocols different from a second set of the plurality of communication devices;
   extracting content metadata from the media content, wherein the content metadata provides a first description of the media content;
   obtaining electronic programming guide metadata, wherein the electronic programming guide metadata is associated with the media content, and wherein the electronic programming guide metadata provides a second description of the media content;
   generating a compact visual representation of the adjusted media content;
   receiving a request for information associated with the media content from a first communication device of the plurality of communication devices; and
   responsive to the request:
      compiling the electronic programming guide metadata and the content metadata based on the user profile as compiled content metadata and compiled electronic programming guide metadata;
      embedding the compiled content metadata and the compiled electronic programming guide metadata in a media stream with the adjusted media content and the compact visual representation; and
      transmitting the media stream to a first communication device of the plurality of communication devices.

2. The machine-readable storage device of claim 1, wherein the operations further comprise monitoring for attempted access to the adjusted media content and transmitting at least a portion of the adjusted media content in response to the attempted access.

3. The machine-readable storage device of claim 1, wherein the extracting comprises detecting a story boundary of the media content as the content metadata.

4. The machine-readable storage device of claim 1, wherein the operations further comprise obtaining the content metadata by applying face detection to the media content.

5. The machine-readable storage device of claim 1, wherein the operations further comprise monitoring for the electronic programming guide metadata from a second source, and wherein the first description is different than the second description.

6. The machine-readable storage device of claim 5, wherein the compiling the electronic programming guide metadata is based on the user profile as compiled guide metadata.

7. A server, comprising:
a processing system including a processor; and
a memory that stores executable instructions that, when executed by the processing system, facilitate performance of operations, comprising:
obtaining distributable media content by monitoring media content that is distributable, the media content being capable of distribution to a plurality of communication devices that are associated with a user as distributed media content;
generating content metadata from the distributable media content using boundary detection, wherein the content metadata provides a first description of the media content;
generating a set of representative images of the distributable media content; obtaining electronic programming guide metadata, wherein the electronic programming guide metadata is associated with the media content, and wherein the electronic programming guide metadata provides a second description of the media content;
compiling the electronic programming guide metadata and the content metadata as compiled content metadata based on a user profile associated with the user;
embedding the compiled content metadata in a media stream with the distributable media content and the set of representative images; and
transmitting the media stream to a first communication device.

8. The server of claim 7, wherein the operations further comprise adjusting the distributable media content for distribution as adjusted media content to the plurality of communication devices of the user based on a user profile associated with the user.

9. The server of claim 7, wherein the boundary detection comprises one of a shot boundary detection, an anchorperson detection, or a story boundary detection.

10. The server of claim 9, wherein a first set of the plurality of communication devices communicate by way of different communication protocols from a second set of the plurality of communication devices.

11. The server of claim 7, wherein the operations further comprise monitoring for the electronic programming guide metadata associated with the distributable media content.

12. The server of claim 11, wherein the operations further comprise:

compiling information from the electronic programming guide metadata based on the user profile associated with the user as compiled guide data; and
embedding the compiled guide data in the media stream with the distributable media content and the set of representative images.

13. A server, comprising:
a processing system including a processor; and
a memory that stores executable instructions that, when executed by the processing system, facilitate performance of operations, comprising:
obtaining media content from a first source that is distributable, the media content being adjusted for distribution to a plurality of communication devices that are associated with a user;
generating an adaption of the media content;
extracting content metadata from the media content, wherein the content metadata provides a first description of the media content;
obtaining electronic programming guide metadata, wherein the electronic programming guide metadata is associated with the media content, and wherein the electronic programming guide metadata provides a second description of the media content;
compiling the electronic programming guide metadata and the content metadata as compiled electronic programming guide metadata and compiled content metadata based on a user profile associated with the user;
embedding the compiled electronic programming guide metadata and the compiled content metadata in a media stream with the media content and the adaption of the media content;
receiving a request for information associated with the media content from a first communication device of the plurality of communication devices; and
transmitting the media stream to the first communication device.

14. The server of claim 13, wherein the operations further comprise monitoring for the electronic programming guide metadata from a second source.

15. The server of claim 14, wherein the operations further comprise embedding the electronic programming guide metadata in the media stream.

16. The server of claim 13, wherein the operations further comprise obtaining the content metadata by applying one of a shot boundary detection, an anchorperson detection, or a story boundary detection.

17. The server of claim 16, wherein the operations further comprise obtaining the content metadata by applying one of a speech recognition or a face detection.

18. The server of claim 13, wherein the operations further comprise adjusting the media content for the distribution to the plurality of communication devices based on a user profile associated with the user.

* * * * *

UNITED STATES PATENT AND TRADEMARK OFFICE
CERTIFICATE OF CORRECTION

PATENT NO. : 9,769,232 B2
APPLICATION NO. : 14/697221
DATED : September 19, 2017
INVENTOR(S) : Zhu Liu et al.

It is certified that error appears in the above-identified patent and that said Letters Patent is hereby corrected as shown below:

On the Title Page

Item (74) delete "Gustin" and insert --Guntin--.

Signed and Sealed this
Seventh Day of November, 2017

Joseph Matal
*Performing the Functions and Duties of the*
*Under Secretary of Commerce for Intellectual Property and*
*Director of the United States Patent and Trademark Office*